(12) United States Patent
Kim et al.

(10) Patent No.: US 11,843,868 B2
(45) Date of Patent: Dec. 12, 2023

(54) ELECTRONIC APPARATUS BASED ON MULTIPLE EXPOSURE IMAGE AND OPERATING METHOD THEREOF

(71) Applicant: SK hynix Inc., Icheon-si (KR)

(72) Inventors: Tae Hyun Kim, Icheon-si (KR); Jin Su Kim, Icheon-si (KR); Jong Hyun Bae, Icheon-si (KR)

(73) Assignee: SK hynix Inc., Icheon-si (KR)

( * ) Notice: Subject to any disclaimer, the term of this patent is extended or adjusted under 35 U.S.C. 154(b) by 0 days.

(21) Appl. No.: 17/700,079

(22) Filed: Mar. 21, 2022

(65) Prior Publication Data

US 2023/0020674 A1 Jan. 19, 2023

(30) Foreign Application Priority Data

Jul. 13, 2021 (KR) .................. 10-2021-0091844
Sep. 24, 2021 (KR) .................. 10-2021-0126344

(51) Int. Cl.
  *H04N 23/73* (2023.01)
  *H04N 23/951* (2023.01)
  *H04N 23/63* (2023.01)
  *H04N 23/68* (2023.01)

(52) U.S. Cl.
  CPC ........... *H04N 23/73* (2023.01); *H04N 23/634* (2023.01); *H04N 23/683* (2023.01); *H04N 23/6811* (2023.01)

(58) Field of Classification Search
  CPC .. H04N 23/73; H04N 23/634; H04N 23/6811; H04N 23/683; H04N 23/81; H04N 23/951
  See application file for complete search history.

(56) References Cited

U.S. PATENT DOCUMENTS

| 7,474,767 B2 | 1/2009 | Sen et al. |
| 8,379,934 B2* | 2/2013 | Jasinski ............... H04N 23/684 348/229.1 |
| 9,160,934 B2* | 10/2015 | Ichikawa ........... H04N 23/6811 |
| 2007/0064977 A1 | 3/2007 | Nagata |

FOREIGN PATENT DOCUMENTS

| KR | 1020200090291 A | 7/2020 |
| KR | 1020210006443 A | 1/2021 |

* cited by examiner

*Primary Examiner* — Ahmed A Berhan
(74) *Attorney, Agent, or Firm* — WILLIAM PARK & ASSOCIATES LTD.

(57) ABSTRACT

An electronic apparatus includes: an image sensor for acquiring an image including normal pixel values that are sensed during a first exposure time and short exposure pixel values that are sensed during a second exposure time that is shorter than the first exposure time; and a processor configured to acquire flag information that indicates that a selected region, among a plurality of regions of the image, is one of a motion region and a normal region by using an exposure ratio of the first exposure time and the second exposure time and by using a short exposure pixel value and normal pixel values, which are included in the selected region, and configured to output a restoration image including a restoration pixel value that is corrected from the short exposure pixel value that is included in the selected region, based on the flag information.

20 Claims, 23 Drawing Sheets

FIG. 5A

|   | 1 | 2 | 3 | 4 | 5 | 6 | 7 | 8 Column |
|---|---|---|---|---|---|---|---|---|
| 1 | Gr1 (ET_N) | Gr2 (ET_N) | R1 (ET_N) | R2 (ET_N) | Gr1 (ET_N) | Gr2 (ET_N) | R1 (ET_N) | R2 (ET_N) |
| 2 | Gr3 (ET_N) | Gr4 (ET_S) | R3 (ET_N) | R4 (ET_N) | Gr3 (ET_N) | Gr4 (ET_S) | R3 (ET_N) | R4 (ET_N) |
| 3 | B1 (ET_N) | B2 (ET_N) | Gb1 (ET_N) | Gb2 (ET_N) | B1 (ET_N) | B2 (ET_N) | Gb1 (ET_N) | Gb2 (ET_N) |
| 4 | B3 (ET_N) | B4 (ET_N) | Gb3 (ET_N) | Gb4 (ET_S) | B3 (ET_N) | B4 (ET_N) | Gb3 (ET_N) | Gb4 (ET_S) |
| 5 | Gr1 (ET_N) | Gr2 (ET_N) | R1 (ET_N) | R2 (ET_N) | Gr1 (ET_N) | Gr2 (ET_N) | R1 (ET_N) | R2 (ET_N) |
| 6 | Gr3 (ET_N) | Gr4 (ET_S) | R3 (ET_N) | R4 (ET_N) | Gr3 (ET_N) | Gr4 (ET_S) | R3 (ET_N) | R4 (ET_N) |
| 7 | B1 (ET_N) | B2 (ET_N) | Gb1 (ET_N) | Gb2 (ET_N) | B1 (ET_N) | B2 (ET_N) | Gb1 (ET_N) | Gb2 (ET_N) |
| 8 | B3 (ET_N) | B4 (ET_N) | Gb3 (ET_N) | Gb4 (ET_S) | B3 (ET_N) | B4 (ET_N) | Gb3 (ET_N) | Gb4 (ET_S) |

Row

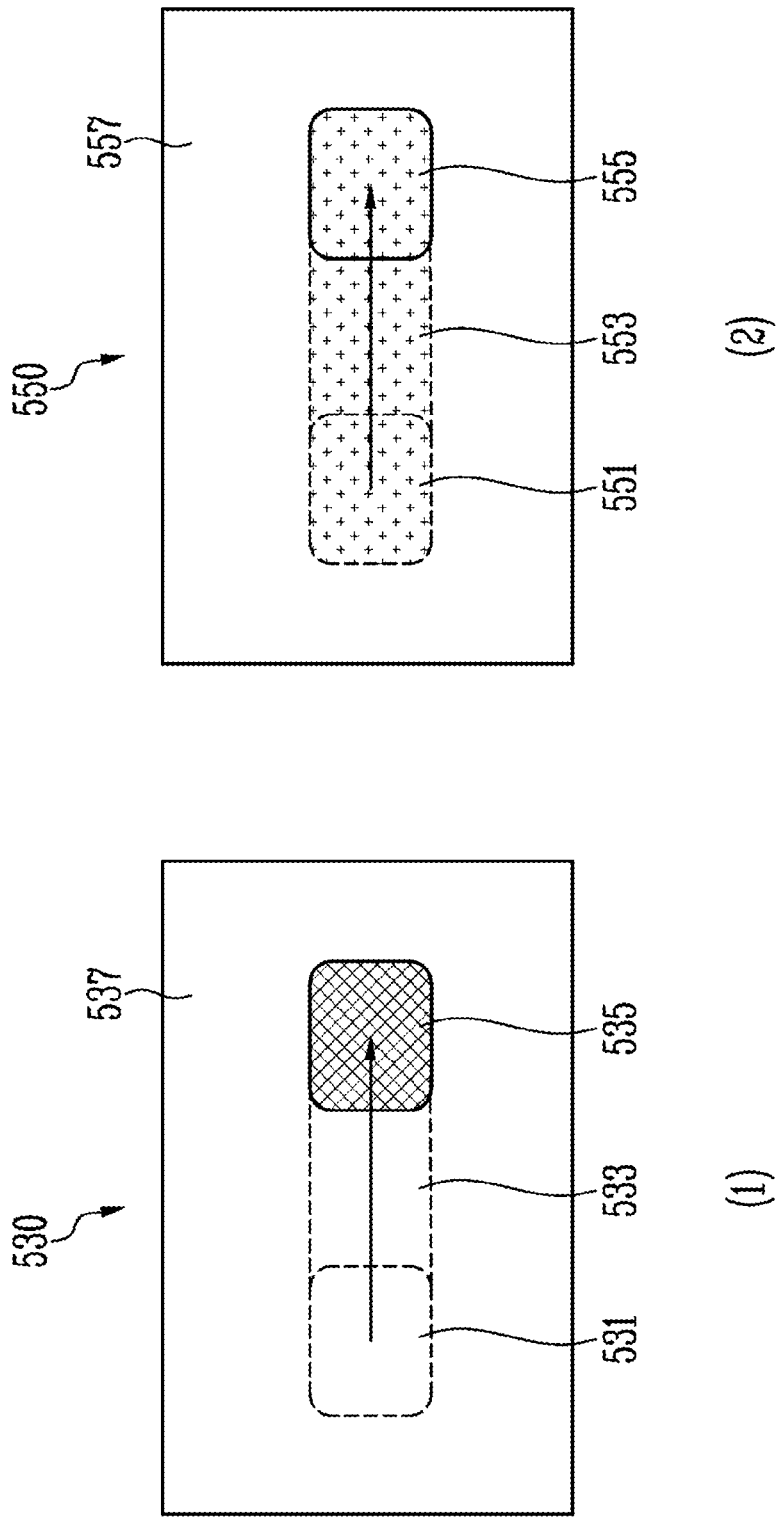

FIG. 5D (1)

| | 1 | 2 | 3 | 4 |
|---|---|---|---|---|
| 4 | Gr2 (ET_2) | Gr4 (ET_4) | R2 (ET_2) | R4 (ET_4) |
| 3 | Gr1 (ET_1) | Gr3 (ET_3) | R1 (ET_1) | R3 (ET_3) |
| 2 | B2 (ET_2) | B4 (ET_4) | Gb2 (ET_2) | Gb4 (ET_4) |
| 1 | B1 (ET_1) | B3 (ET_3) | Gb1 (ET_1) | Gb3 (ET_3) |

(2)

| | 1 | 2 | 3 | 4 | 5 | 6 |
|---|---|---|---|---|---|---|
| 6 | Gr1 (ET_1) | Gr2 (ET_2) | Gr3 (ET_3) | R1 (ET_1) | R2 (ET_2) | R3 (ET_3) |
| 5 | Gr4 (ET_4) | Gr5 (ET_5) | Gr6 (ET_6) | R4 (ET_4) | R5 (ET_5) | R6 (ET_6) |
| 4 | Gr7 (ET_7) | Gr8 (ET_8) | Gr9 (ET_9) | R7 (ET_7) | R8 (ET_8) | R9 (ET_9) |
| 3 | B1 (ET_1) | B2 (ET_2) | B3 (ET_3) | Gb1 (ET_1) | Gb2 (ET_2) | Gb3 (ET_3) |
| 2 | B4 (ET_4) | B5 (ET_5) | B6 (ET_6) | Gb4 (ET_4) | Gb5 (ET_5) | Gb6 (ET_6) |
| 1 | B7 (ET_7) | B8 (ET_8) | B9 (ET_9) | Gb7 (ET_7) | Gb8 (ET_8) | Gb9 (ET_9) |

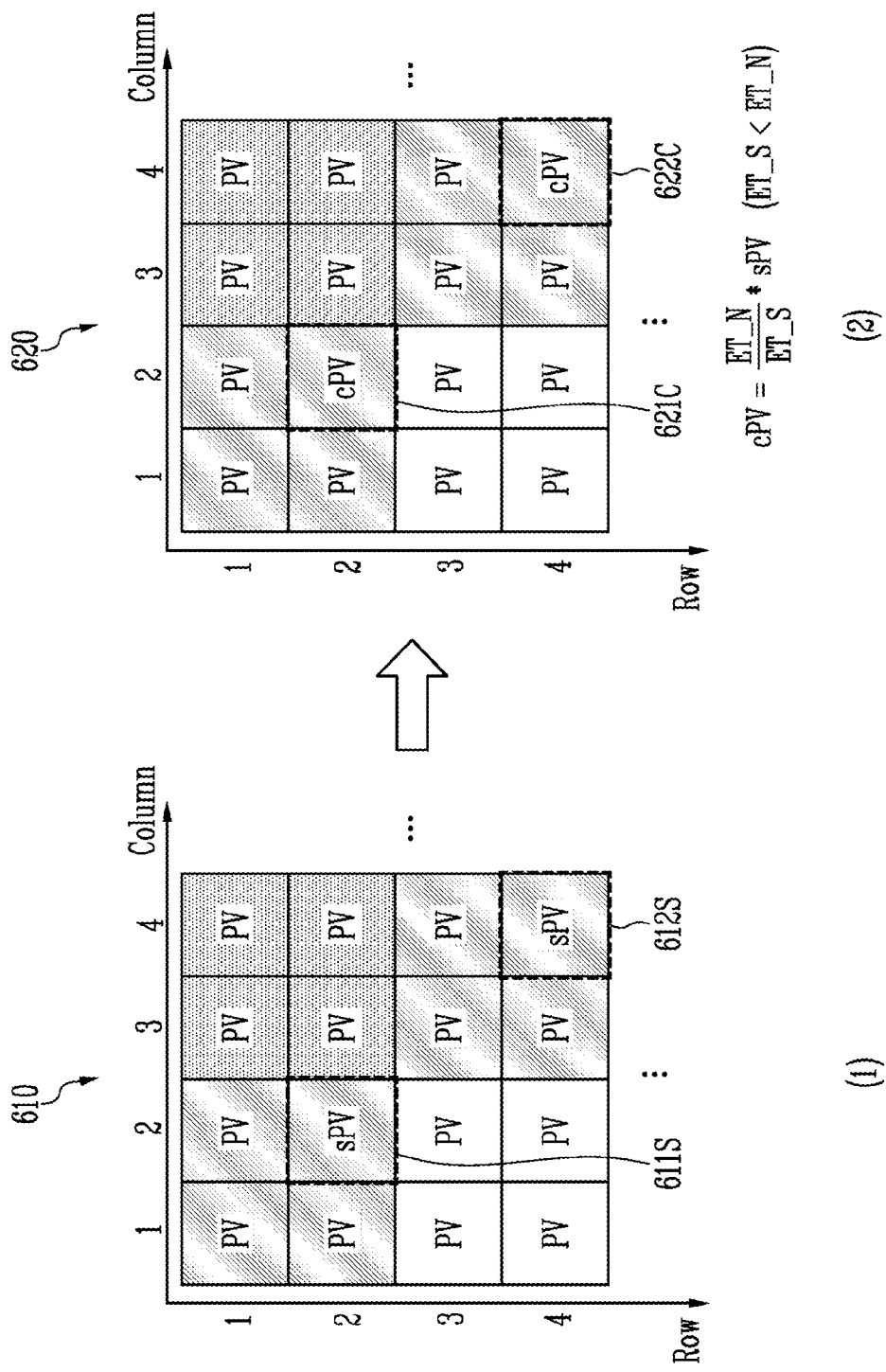

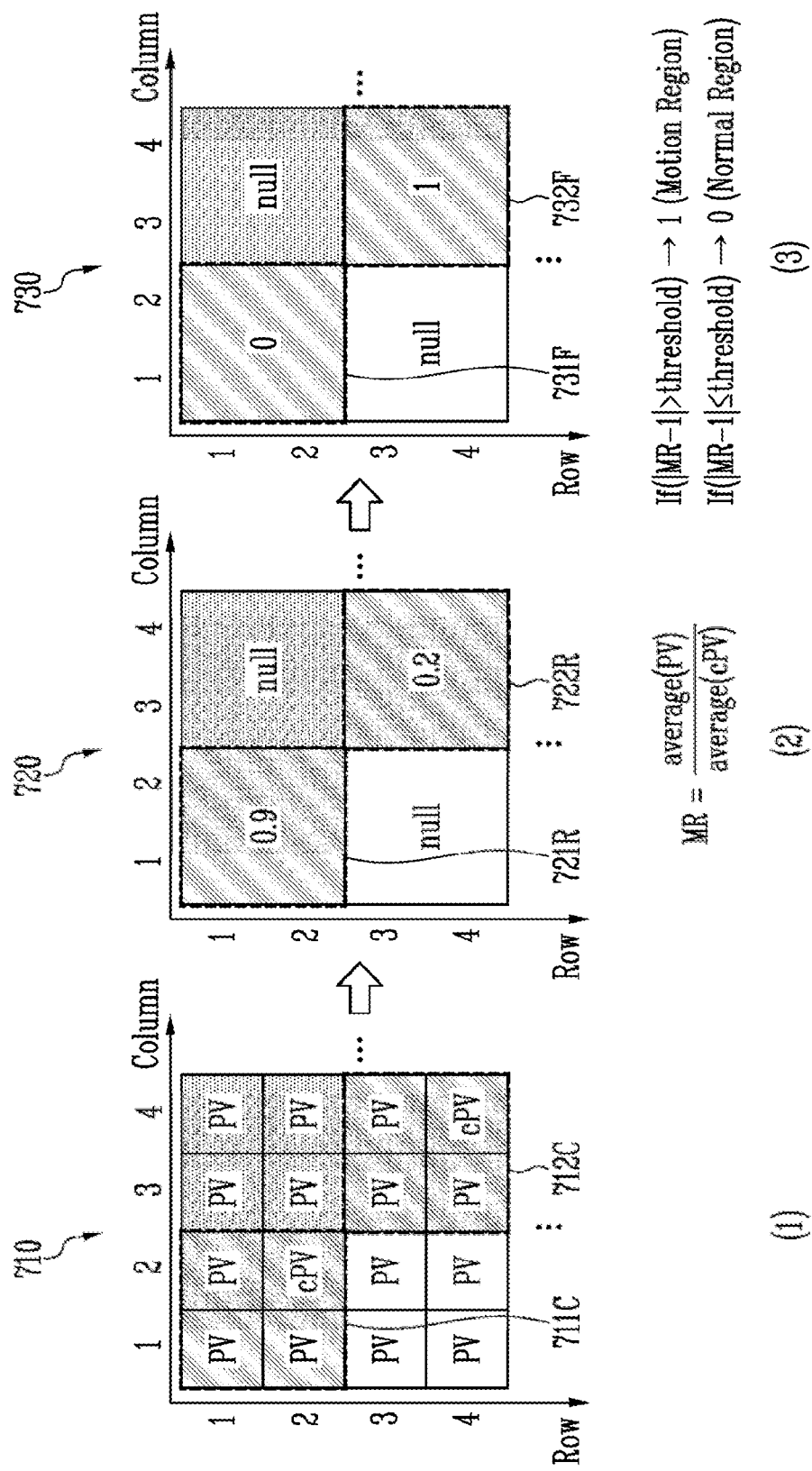

FIG. 7B

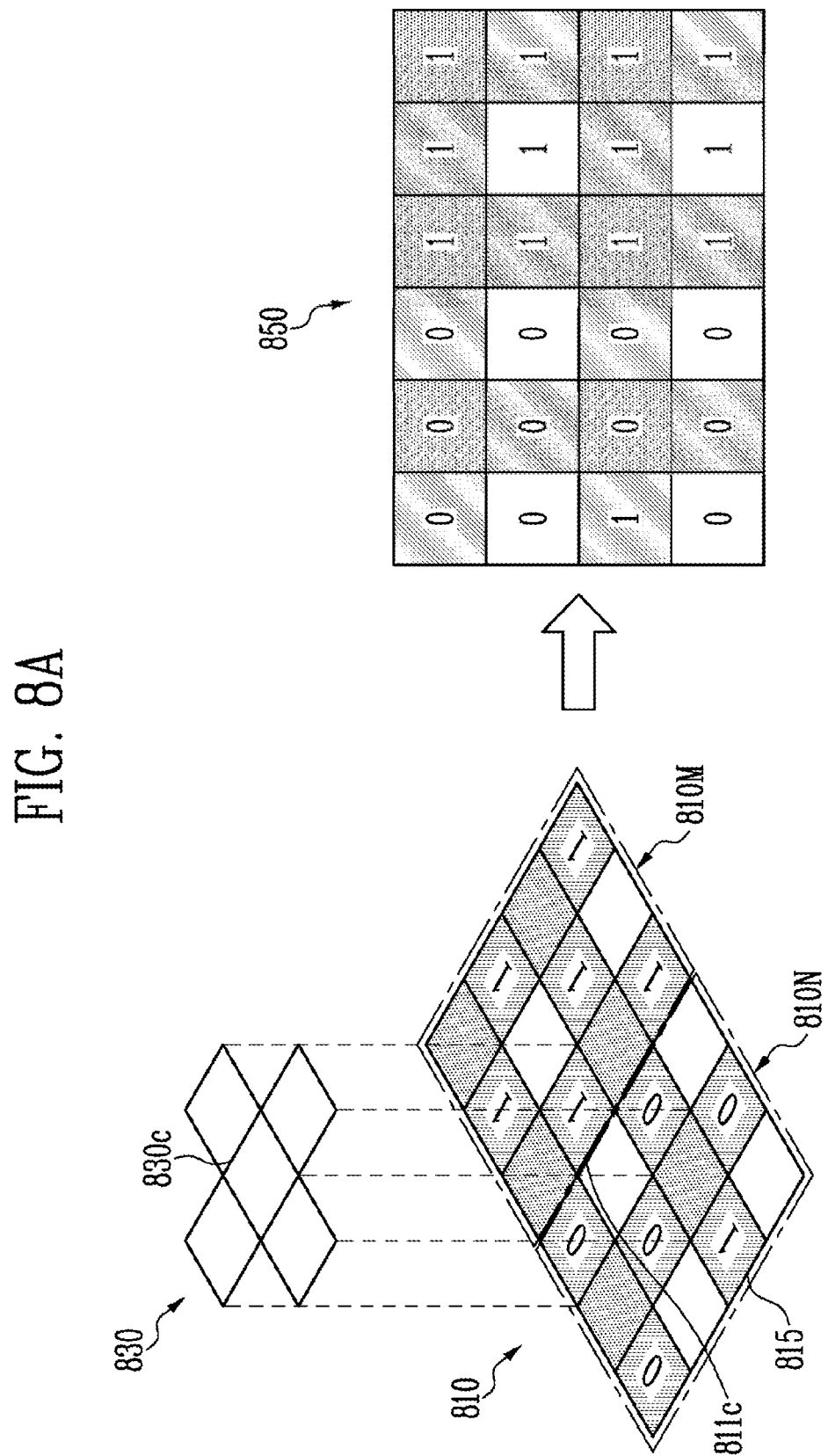

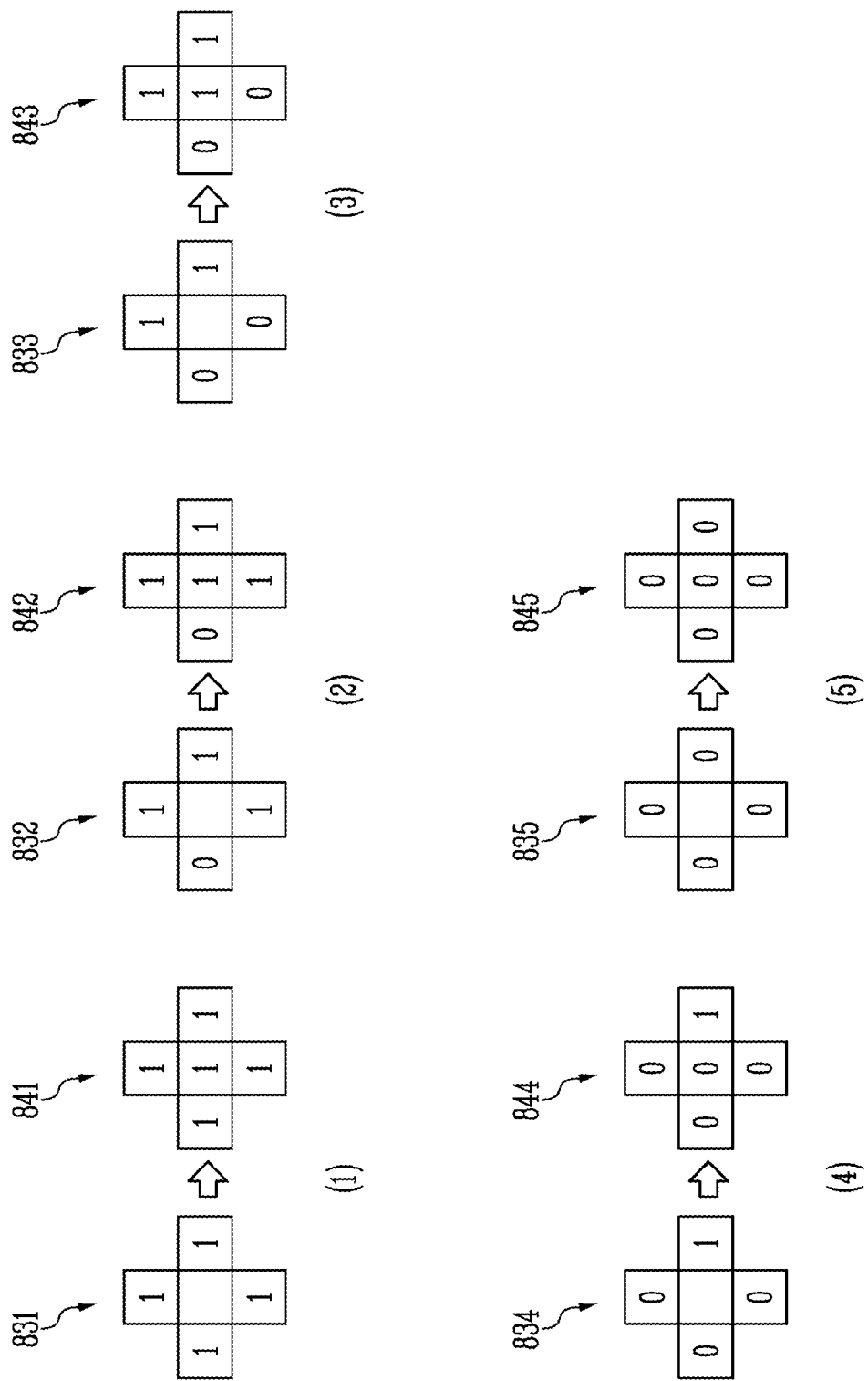

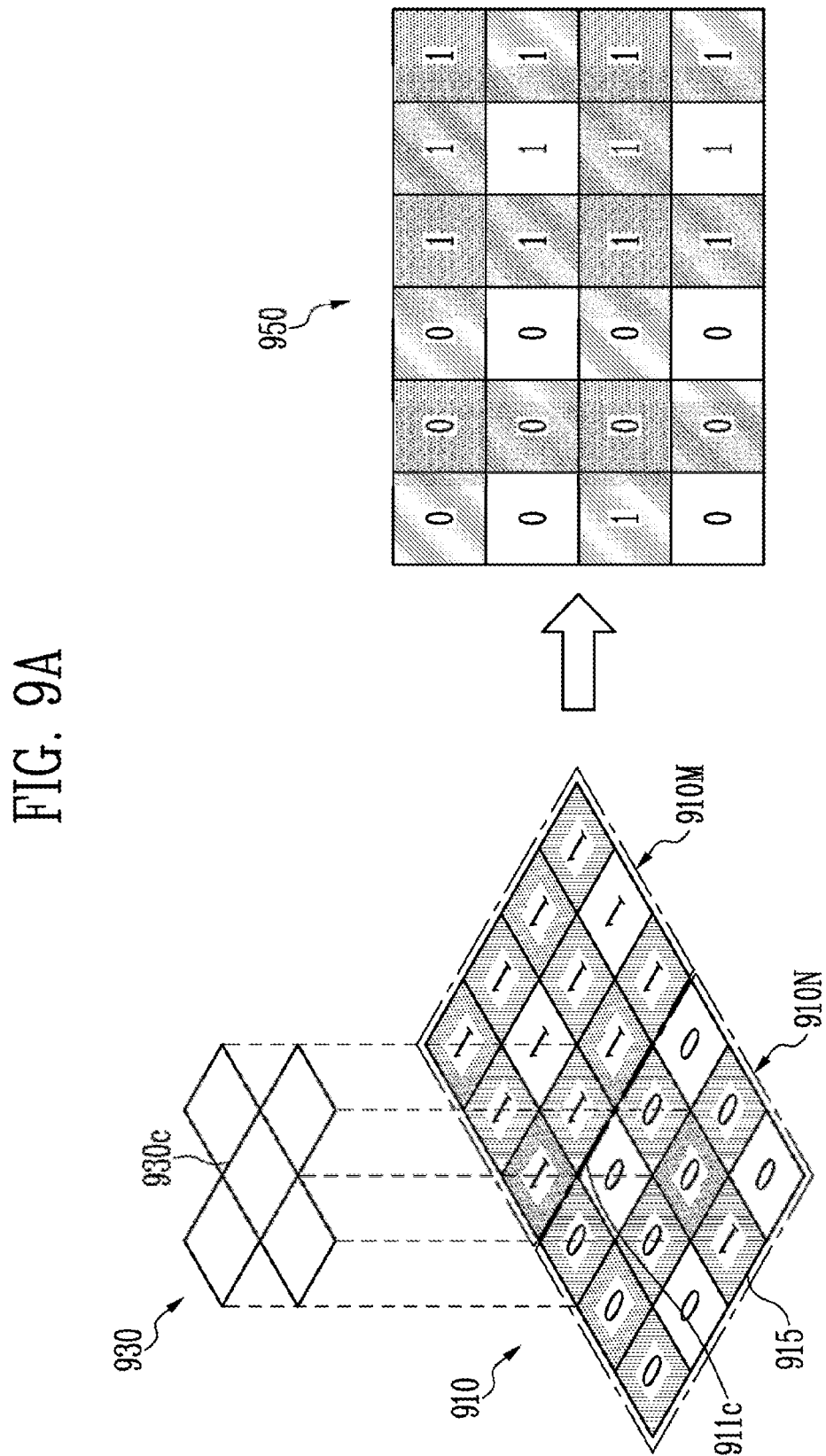

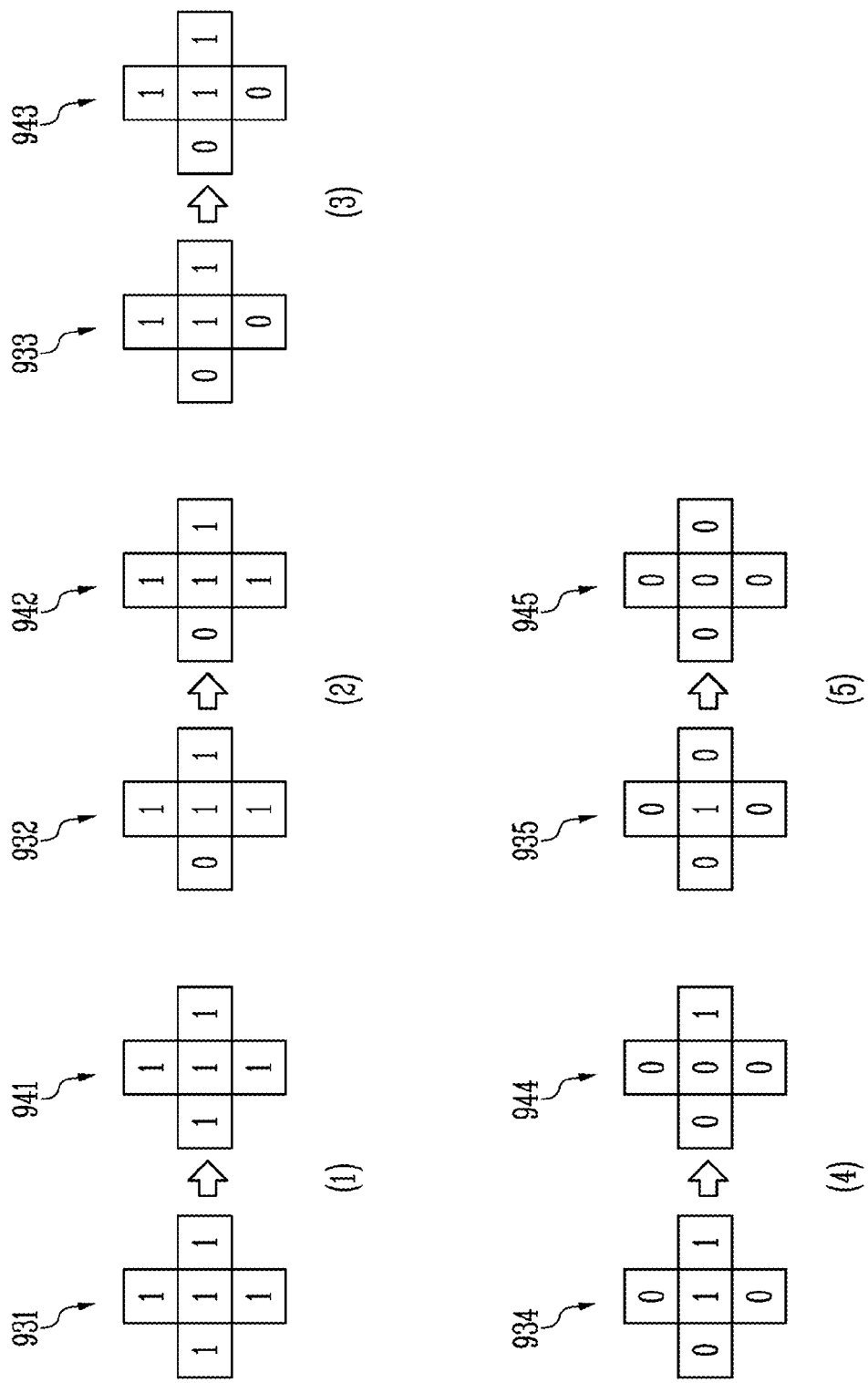

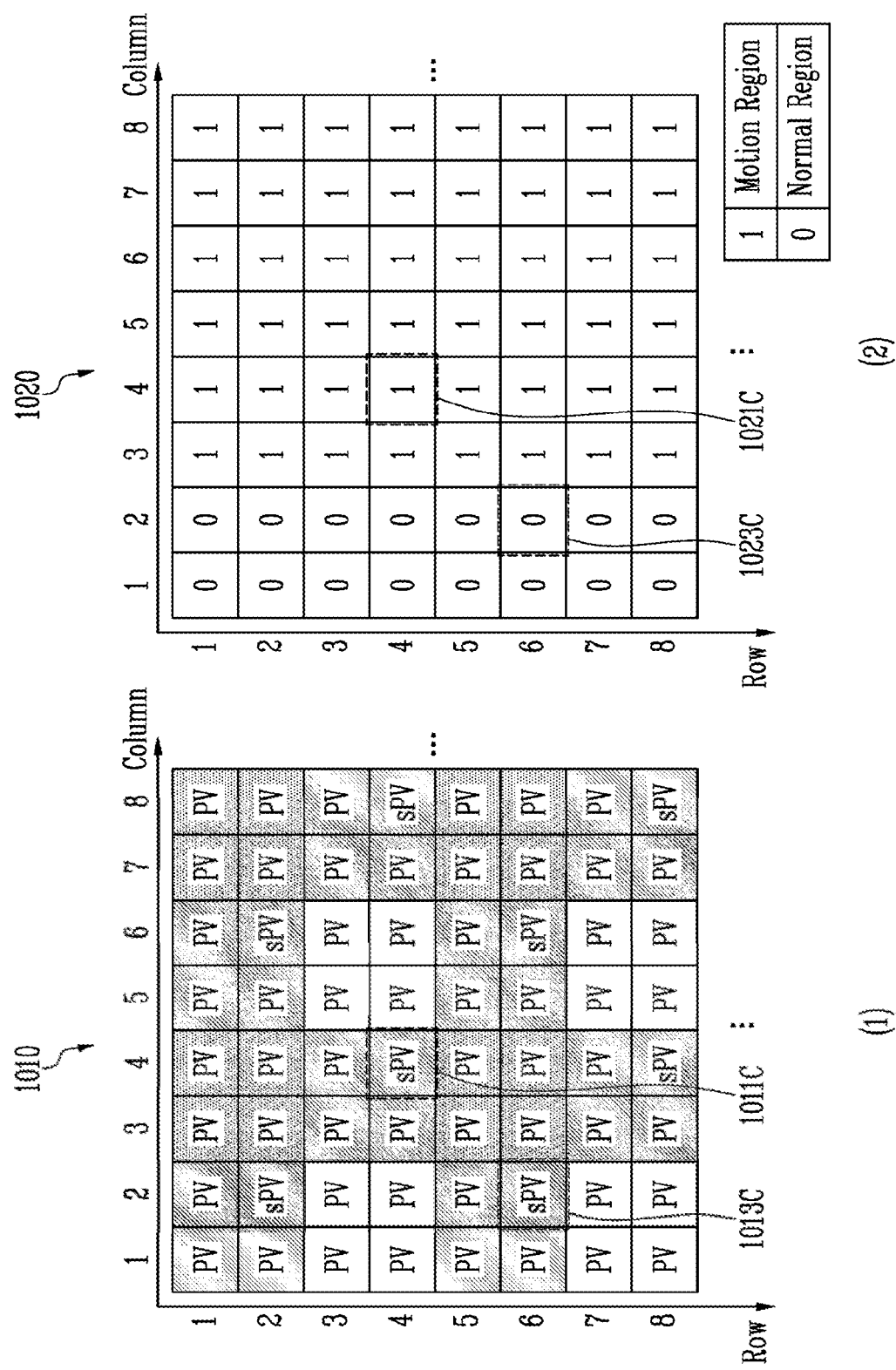

FIG. 10B $$cPV = \frac{ET\_N}{ET\_S} * sPV \quad (2)$$

$$iPV = \frac{3*TP+3*LP+1*RP+1*BP}{8} \quad (3)$$

FIG. 10C $$iPV = \frac{3*TP+3*LP+1*RP+1*BP}{8}$$

$$= \frac{TP+LP}{2}$$

(2)

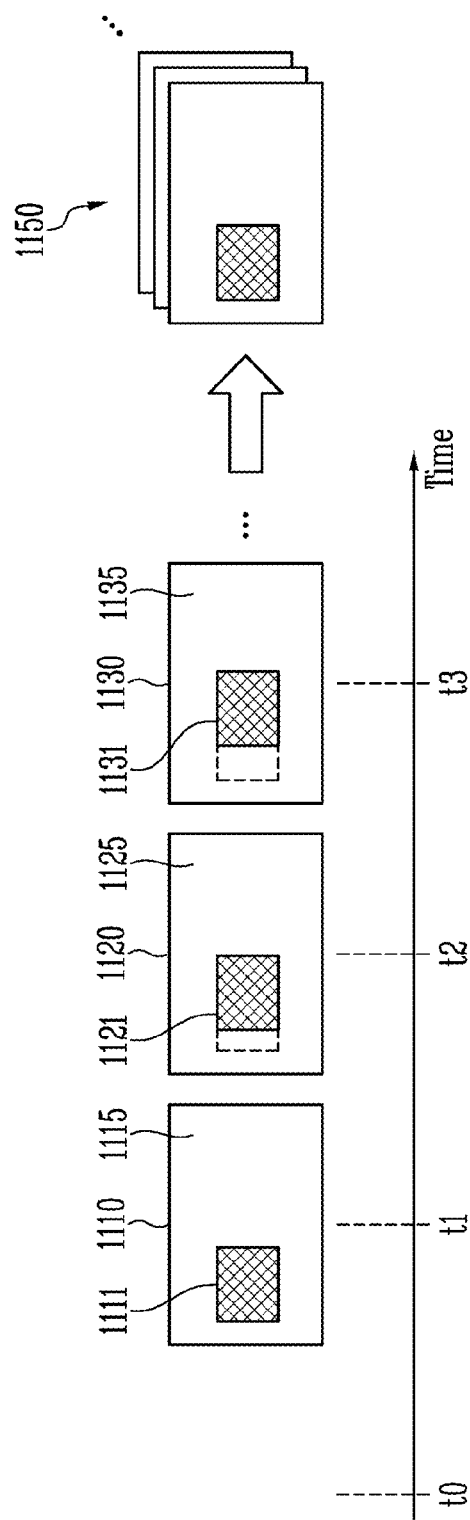

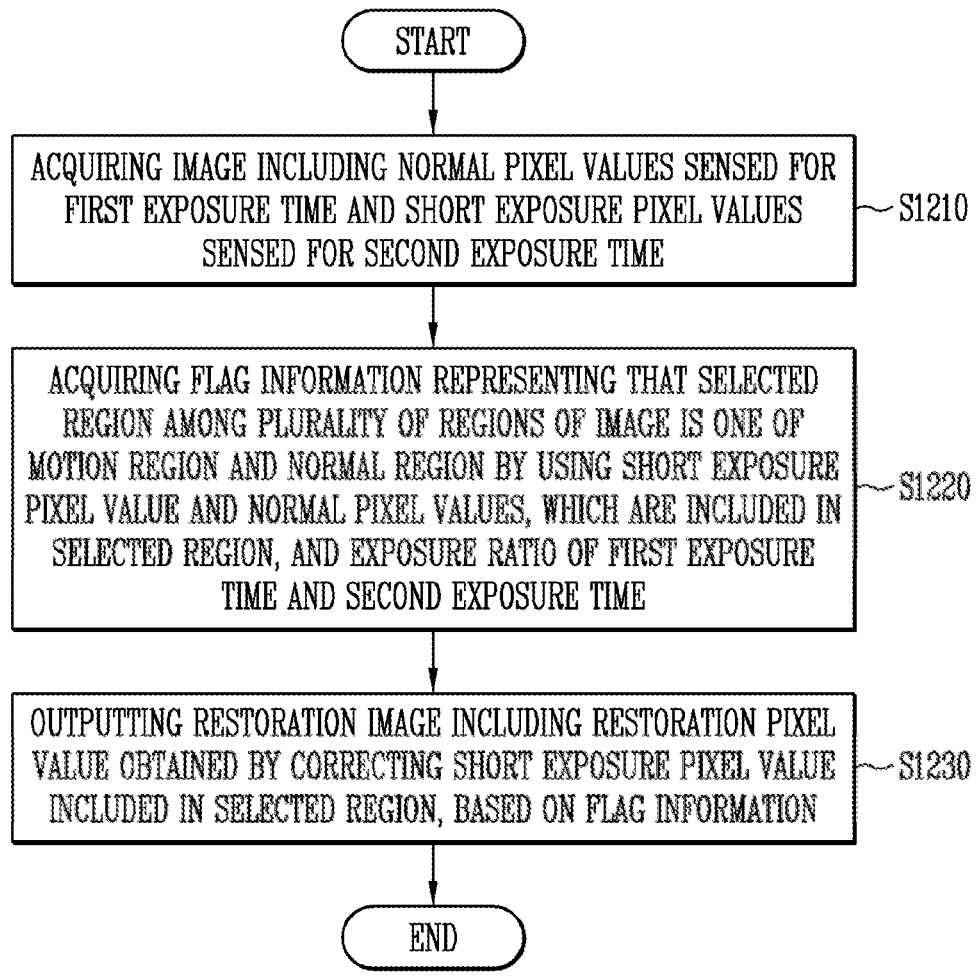

ELECTRONIC APPARATUS BASED ON MULTIPLE EXPOSURE IMAGE AND OPERATING METHOD THEREOF

CROSS-REFERENCE TO RELATED APPLICATION

The present application claims priority under 35 U.S.C. § 119(a) to Korean patent application number 10-2021-0091844, filed on Jul. 13, 2021 and Korean patent application number 10-2021-0126344, filed on Sep. 24, 2021, in the Korean Intellectual Property Office, the entire disclosure of which is incorporated herein by reference.

BACKGROUND

1. Technical Field

The present disclosure generally relates to an electronic apparatus and an operating method thereof, and more particularly, to an electronic apparatus for performing image processing and an operating method of the electronic apparatus.

2. Related Art

Recently, with the development of electronic technologies, demands for image sensors have increased in various electronic apparatuses including smart phones, digital cameras, game consoles, Internet of things, robots, surveillance cameras, medical cameras, autonomous vehicles, and the like. An image sensor may generate an image by converting light into an electrical signal.

In general, an image processing method of comparing a plurality of images consecutively acquired according to time may be used to detect a region in which a motion of an object exists in an image. However, in the image processing method, a separate storage space for storing previously acquired images is necessary, and it is difficult to apply the image processing method in an environment requiring a low power technique, in that power consumption occurs due to the storage of an image whenever the image is acquired. Accordingly, a technique for solving these problems is required.

SUMMARY

In accordance with an aspect of the present disclosure, there is provided an electronic apparatus including: an image sensor configured to acquire an image including normal pixel values that are sensed during a first exposure time and short exposure pixel values that are sensed during a second exposure time that is shorter than the first exposure time; and a processor configured to acquire flag information that indicates that a selected region, among a plurality of regions of the image, is one of a motion region and a normal region by using an exposure ratio of the first exposure time and the second exposure time and by using a short exposure pixel value and normal pixel values, which are included in the selected region, and configured to output a restoration image including a restoration pixel value that is corrected from the short exposure pixel value that is included in the selected region, based on the flag information.

In accordance with another aspect of the present disclosure, there is provided a method of operating an electronic apparatus, the method including: acquiring an image including normal pixel values that are sensed during a first exposure time and short exposure pixel values that are sensed during a second exposure time that is shorter than the first exposure time; acquiring flag information that indicates that a selected region among a plurality of regions of the image is one of a motion region and a normal region by using an exposure ratio of the first exposure time and the second exposure time and by using a short exposure pixel value and normal pixel values, which are included in the selected region; and outputting a restoration image including a restoration pixel value that is corrected from the short exposure pixel value that is included in the selected region, based on the flag information.

In accordance with still another aspect of the present disclosure, there is provided an electronic apparatus including: a communication interface configured to receive, from an external device, an image including normal pixel values and short exposure pixel values, which are sensed during different exposure times; and a processor configured to determine whether a selected region among a plurality of regions of the image is a motion region or a normal region by using an exposure ratio of the exposure times and by using a short exposure pixel and normal pixel values, which are included in the selected region, and acquire a first restoration pixel value that is corrected from the short exposure pixel value by using peripheral pixel values of the short exposure pixel value, when the selected region is the motion region, and acquire a second restoration pixel value that is corrected from the short exposure pixel value, using the exposure ratio, when the selected region is the normal region.

BRIEF DESCRIPTION OF THE DRAWINGS

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the example embodiments to those skilled in the art.

In the drawing figures, dimensions may be exaggerated for clarity of illustration. It will be understood that when an element is referred to as being "between" two elements, it can be the only element between the two elements, or one or more intervening elements may also be present. Like reference numerals refer to like elements throughout.

FIG. 5A is a diagram illustrating an image in accordance with an embodiment of the present disclosure.

FIG. 5C is a diagram illustrating an image that is acquired according to the exposure time in accordance with an embodiment of the present disclosure.

FIG. 5D is a diagram illustrating an image in accordance with an embodiment of the present disclosure.

FIG. 6 is a diagram illustrating an operation of an exposure corrector in accordance with an embodiment of the present disclosure.

FIG. 7A is a diagram illustrating operations of a motion rate calculator and a motion region detector in accordance with an embodiment of the present disclosure.

FIG. 7B is a diagram illustrating a form of flag information in accordance with an embodiment of the present disclosure.

FIG. 8A is a diagram illustrating an operation of the motion region detector in accordance with an embodiment of the present disclosure.

FIG. 8B is a diagram illustrating an operation of the motion region detector in accordance with an embodiment of the present disclosure.

FIG. 9A is a diagram illustrating an operation of a noise filter in accordance with an embodiment of the present disclosure.

FIG. 9B is a diagram illustrating an operation of the noise filter in accordance with an embodiment of the present disclosure.

FIG. 10A is a diagram illustrating an operation of a pixel corrector in accordance with an embodiment of the present disclosure.

FIG. 10B is a diagram illustrating an operation of the pixel corrector in accordance with an embodiment of the present disclosure.

FIG. 10C is a diagram illustrating an operation of the pixel corrector in accordance with an embodiment of the present disclosure.

FIG. 11 is a diagram illustrating a method of compressing an image by using flag information in accordance with an embodiment of the present disclosure.

FIG. 12 is a diagram illustrating an operating method of an electronic apparatus in accordance with an embodiment of the present disclosure.

DETAILED DESCRIPTION

The specific structural or functional description disclosed herein is merely illustrative for the purpose of describing embodiments according to the concept of the present disclosure. The embodiments according to the concept of the present disclosure can be implemented in various forms, and cannot be construed as limited to the embodiments set forth herein.

Embodiments provide an electronic apparatus capable of detecting a motion region that is included in one image and an operating method of the electronic apparatus.

Figure 1A:
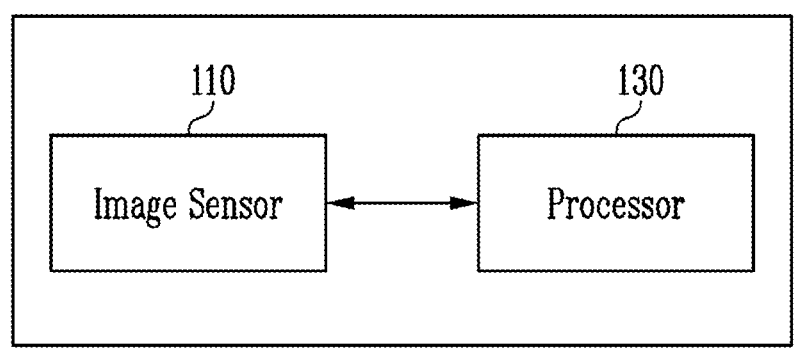
FIG. 1A is a diagram illustrating an electronic apparatus in accordance with an embodiment of the present disclosure.
Figure 1B:
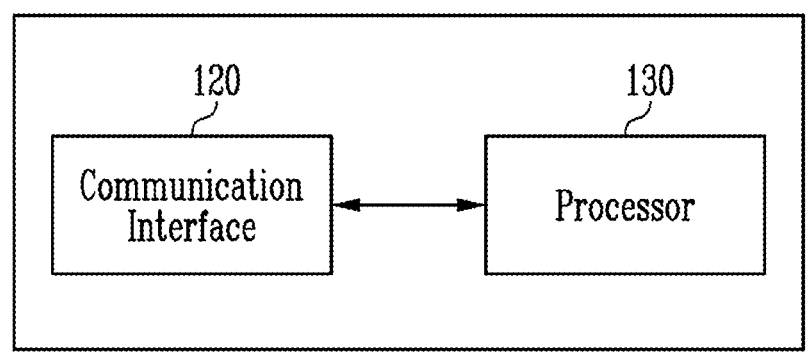
FIG. 1B is a diagram illustrating an electronic apparatus in accordance with an embodiment of the present disclosure.

FIG. 1A is a diagram illustrating an electronic apparatus in accordance with an embodiment of the present disclosure. FIG. 1B is a diagram illustrating an electronic apparatus in accordance with an embodiment of the present disclosure.

Referring to FIG. 1A, the electronic apparatus may include an image sensor 110 and a processor 130.

The electronic apparatus 10 may be an image pickup device, a digital camera, a camcorder, a closed-circuit television (CCTV), a webcam, a security camera, an industrial vision camera, a mobile device, a smart phone, a personal computer (PC), a tablet PC, a notebook computer, a personal digital assistant (PDA), an enterprise digital assistant (EDA), a portable multimedia player (PMP), a wearable device, a black box, a robot, an autonomous vehicle, a vehicle vision camera, a set top box, a game console, an electronic dictionary, an electronic book reader, a desktop computer, a server, an MP3 player, a smart medical device, a television, a digital video disk (DVD) player, an audio, a refrigerator, an air conditioner, a vacuum cleaner, an oven, a microwave oven, a washing machine, an air cleaner, a smart mirror, a smart window, an electronic key, an electronic frame, a digital advertising board, a security control panel, or the like. The wearable device may be a smart watch, a ring, a bracelet, an anklet, a necklace, glasses, a contact lens, a head-mounted device (HMD), a skin pad, an electronic tattoo, or a bio-implantable type circuit, or the like.

The electronic apparatus 10 may be implemented in the form of a packaged module, part or the like. That is, the electronic apparatus 10 may operate as one component that is included in a computing system. The computing system may be implemented as, for example, various devices, including a digital camera, a mobile device, a smart phone, a personal computer (PC), a tablet PC, a notebook computer, a personal digital assistant (PDA), an enterprise digital assistant (EDA), a portable multimedia player (PMP), a wearable device, a black box, a robot, an autonomous vehicle, and the like.

The image sensor 110 may acquire an image by sensing an optical signal. To this end, the image sensor 110 may be implemented as a Charged Coupled Device (CCD) image sensor, a Complementary Metal Oxide Semiconductor (CMOS) image sensor, or the like.

An image may include pixel data. The pixel data may be acquired through a plurality of pixels that are arranged along rows and columns. One pixel data may include information that is associated with one pixel, which acquires the corresponding pixel data. Specifically, the pixel data may include information regarding a pixel value, a color, a position, and an exposure time. The pixel value may represent the brightness of an optical signal that is sensed by the corresponding pixel. The pixel value may have a value within a range of an allocated data bit. For example, when the data bit corresponds to 8 bits, the pixel value may have a natural number value within a range of 0 to 255. The position may represent a row and a column on which the corresponding pixel is arranged. The color may represent the color of the optical signal that is sensed by the corresponding pixel. For example, the color may be one of red, green, and blue. However, this is merely an embodiment, and the color is not limited to the above-described colors. The exposure time may represent a time at which the corresponding pixel senses the optical signal.

The image sensor 110 may acquire an image including normal pixel values and short exposure pixel values. The normal pixel value may be a pixel value that is sensed during a first exposure time, and the short exposure pixel value may be a pixel value that is sensed during a second exposure time. The second exposure time may be a time that is shorter than the first exposure time. That is, the image sensor 110 may acquire an image including pixel values that are sensed during different exposure times. However, this is merely an embodiment. The type and number of exposure times are not limited thereto and may be variously modified and embodied.

The processor 130 may control the overall operations of the electronic apparatus 100. To this end, the processor 130 may include at least one processing device. For example, the processor 130 may include at least one of an image signal processor (ISP), a digital signal processor (DSP), an application processor (AP), a graphics processing unit (GPU), a central processing unit (CPU), a controller, and the like.

When a user request is received, the processor 130 may control the image sensor 110 to acquire an image. Specifically, the processor 130 may receive the user request through an input interface. For example, the input interface may be implemented as one of a touch sensing panel, a keyboard, a mouse, a button, a microphone, and the like. Alternatively, the processor 130 may receive the user request from an external device through a communication interface. The processor 130 may transmit, to the image sensor 110, a command that instructs the image sensor 110 to acquire the image. Also, the processor 130 may receive the image that is acquired from the image sensor 110. The image may include normal pixel values that are sensed during a first exposure time and short exposure pixel values that are sensed during a second exposure time that is shorter than the first exposure time.

Also, when the image is received, the processor 130 may determine each of the regions of the image as a motion region or a normal region by using the short exposure pixel values and the normal pixel values, which are included in the image. The processor 130 may acquire flag information that indicates a result that is obtained by determining each of the regions of the image as the motion region or the normal region. The motion region may represent a region, among a plurality of regions of the image, in which a motion of an object occurs. The normal region may represent a region, among the plurality of regions of the image, in which the motion of the object does not occur.

Also, the processor 130 may output a restoration image that is corrected from the short exposure pixel values that are included in the image. Specifically, the processor 130 may acquire restoration pixel values that are corrected from the short exposure pixel values that are included in the image. The processor 130 may acquire the restoration image including the normal pixel values that are included in the image and the restoration pixel values. For example, the processor 130 may acquire a first restoration pixel value by using peripheral pixel values of the short exposure pixel value. The first restoration pixel value may be a value for correcting a short exposure pixel value that is included in the motion region. For example, the short exposure pixel value that is included in the motion region may be changed to the first restoration value through the correction. The processor 130 may acquire a second restoration pixel value by using an exposure ratio. The second restoration pixel value may be a value for correcting a short exposure pixel value that is included in the normal region. For example, the short exposure pixel value that is included in the normal region may be changed to the second restoration value through the correction. The processor 130 may output the restoration image including the first restoration pixel value that is included in the motion region or the second restoration pixel value that is included in the normal region. A difference between a normal pixel value and a pixel value, which have different exposure times, occurs in the short exposure pixel value, and it is highly likely that noise will occur in the short exposure pixel value. Hence, the short exposure pixel value is corrected, so that this problem can be solved.

Referring to FIG. 1B, the electronic apparatus 100 may include a communication interface 120 and a processor 130.

The communication interface 120 may transmit/receive information or signals through communication according to various communication schemes. To this end, the communication interface 120 may include a circuit for performing wired communication or wireless communication. For example, the communication interface 120 may include at least one of a Bluetooth module, a Wi-Fi module, a cellular communication module, a Near Field Communication (NFC) module, an infrared communication module, a Zigbee communication module, an Ultra-wideband (UWB) module, an ultrasonic module, an Ethernet module, a Local Area Network (LAN) module, a Mobile High-Definition Link (MHL), a Universal Serial Bus (USB), a Display Port (DP), a High Definition Multimedia Interface (HDMI), a Digital Visual Interface (DVI), a thunderbolt module, an optical communication module, a satellite communication module, and a component.

The electronic apparatus 100 may receive an image from an external device through the communication interface 120. The external device may be a device including the above-described image sensor 110. The electronic apparatus 100 may be a server. However, this is merely an embodiment, and the electronic apparatus 100 may be one of various devices such as a PC, a set top box, a smart speaker, and a television, which are described above.

The image received through the communication interface 120 may include normal pixel values and short exposure pixel values, which are sensed during different exposure times. The image may include normal pixel values that are sensed during a first exposure time and short exposure pixel values that are sensed during a second exposure time that is shorter than the first exposure time.

The processor 130 may receive the image through the communication interface 120. Also, when the image is received, the processor 130 may determine each of regions of the image as a motion region or a normal region by using the short exposure pixel values and the normal pixel values, which are included in the image. Also, the processor 130 may output a restoration image that is corrected from the short exposure pixel values that are included in the image. As described above, the electronic apparatus 100 may detect a motion region by using an image that is acquired from the image sensor 110 that is mounted therein or the external device and may output a restoration image that is corrected from the short exposure pixel values that are included in the image.

As described above, the electronic apparatus 100 can detect a motion region by using one image without any previous image. Accordingly, the memory space and power consumption for storing previous images can be reduced. Further, the electronic apparatus 100 can acquire a restoration image of which image quality is not deteriorated or is improved, compared to a case in which an image including pixel values all sensed for the same time.

Hereinafter, embodiments of the present disclosure will be described in more detail with reference to the accompanying drawings.

Figure 2:
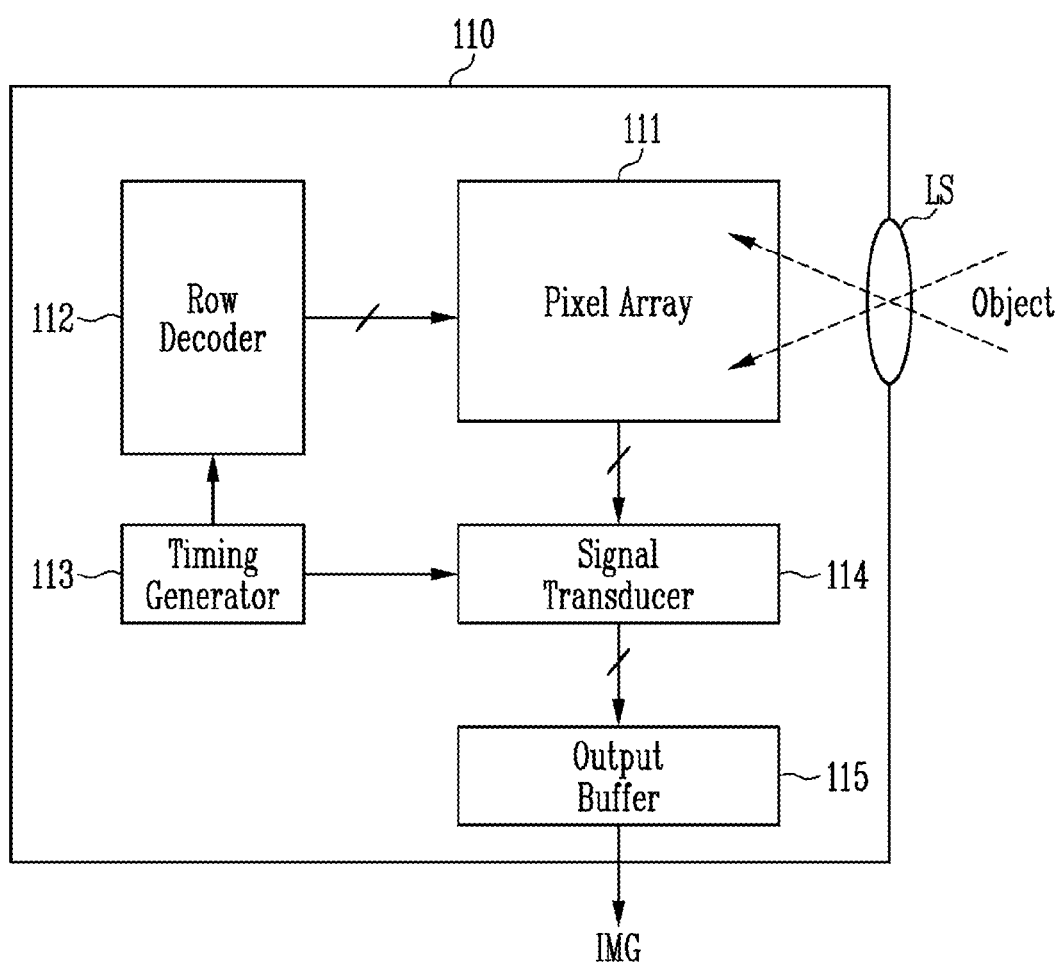
FIG. 2 is a diagram illustrating an image sensor in accordance with an embodiment of the present disclosure.

FIG. 2 is a diagram illustrating an image sensor in accordance with an embodiment of the present disclosure.

Referring to FIG. 2, the image sensor 110 may include an optical lens LS, a pixel array 111, a row decoder 112, a timing generator 113, a signal transducer 114, and an output buffer 115.

The optical lens LS may refract an optical signal. The optical signal that is refracted through the optical lens LS may be transferred to the pixel array 111. To this end, the optical lens LS may be an assembly of microlenses that are arranged on the pixel array 111. Meanwhile, the optical signal may include information on an object, such as the size, shape, position, color, and the like of the object. The object may be a subject to be photographed, such as a person, a thing, an animal, or a plant, which exists at the outside.

The pixel array 111 may include a plurality of pixels. The plurality of pixels may be arranged in a row direction and a column direction. The pixels of the pixel array 111 may respectively correspond to pixel values of an image IMG. The pixels of the pixel array 111 may be ones that are arranged in a physical region, and the pixel values of the image IMG may be ones that are arranged in a digital region. A pixel of the pixel array 111 and a pixel value of the image IMG may have a corresponding relationship with respect to the same arrangement position.

Each pixel of the pixel array 110 may include a color filter and a sensing circuit.

The color filter may be disposed on the top of the sensing circuit. An optical signal that is refracted through the optical lens LS may reach the sensing circuit while passing through the color filter. The color filter may function to allow an optical signal of a specific color or a specific wavelength to pass therethrough and block an optical signal of the other colors or the other wavelengths. The color filter may have a color corresponding to one of red, green, and blue. The pixel may be designated as a red pixel, a green pixel, or a blue pixel according to the color of the color filter included in the pixel. However, this is merely an embodiment, and the color of the color filter may be variously changed.

The pixels of the pixel array 111 may be arranged according to a Bayer pattern. Specifically, groups of pixels, each of which has pixels of the same color, may be alternately arranged. That is, pixels of the same color may be included in one group, and pixels in one group may be arranged in m×n. Here, m and n are natural numbers. For example, in the case of a quad Bayer pattern, each group may include pixels which have the same color and are arranged in 2×2.

The sensing circuit may be disposed on the bottom of the color filter. The sensing circuit may include a light sensing element. The light sensing element may generate an electrical pixel signal from an optical signal received using a photoelectric effect. For example, when an optical signal is received to the light sensing element for an exposure time, charges corresponding to the optical signal may be accumulated in the sensing circuit, and a pixel signal corresponding to the charges accumulated in the sensing circuit may be generated. To this end, the light sensing element may be implemented as various semiconductor elements such as a pn junction diode, a Positive-Intrinsic-Negative (PIN) photo diode, an Avalanche Photo Diode (APD), and a photo transistor.

The row decoder 112 may select pixels for reading pixel data under the control of the timing generator 113. For example, the row decoder 112 may select pixels, among the plurality of pixels that are included in the pixel array 111, located on a row corresponding to an address output from the timing generator 113 in response to the address and control signals.

The timing generator 113 may control the row decoder 112 and the signal transducer 114 to read pixel data from pixels that are located on a specific row in the pixel array 111. For example, the timing generator 113 may sequentially output, to the row decoder 112, a row address representing the pixels that are located on the specific row. The timing generator 113 may output, to the row decoder 112, a command for adjusting an exposure time of a pixel that is located on a specific column.

The signal transducer 114 may acquire pixel data by using pixel signals received from the pixel array 111 and a row address received from the timing generator 113. Also, the signal transducer 114 may transfer the pixel data to the output buffer 115.

Specifically, the signal transducer 114 may be connected to the pixels of the pixel array 111 through a plurality of column lines. Pixels in proportion to the number of rows connected to one column line. The signal transducer 114 may receive pixel signals with respect to pixels that are located on one row through each column line. That is, the signal transducer 114 may receive pixel signals in units of rows. The signal transducer 114 may acquire a pixel value corresponding to the level of a pixel signal received from the pixel array 111. The pixel signal may be, for example, a voltage. To this end, the signal transducer 114 may include an analog-digital converter. Also, the signal transducer 114 may acquire information on a color of pixels that are located on a row corresponding to a row address received from the timing generator 113, based on color information of pixels mapped to each of row addresses.

The output buffer 115 may be connected to the signal transducer 114 through the plurality of column lines. The output buffer 115 may sequentially store pixel values in units of rows, which are received from the signal transducer 114. When pixel values with respect to all rows are stored, the output buffer 115 may output one image IMG including the stored pixel values.

Figure 3:
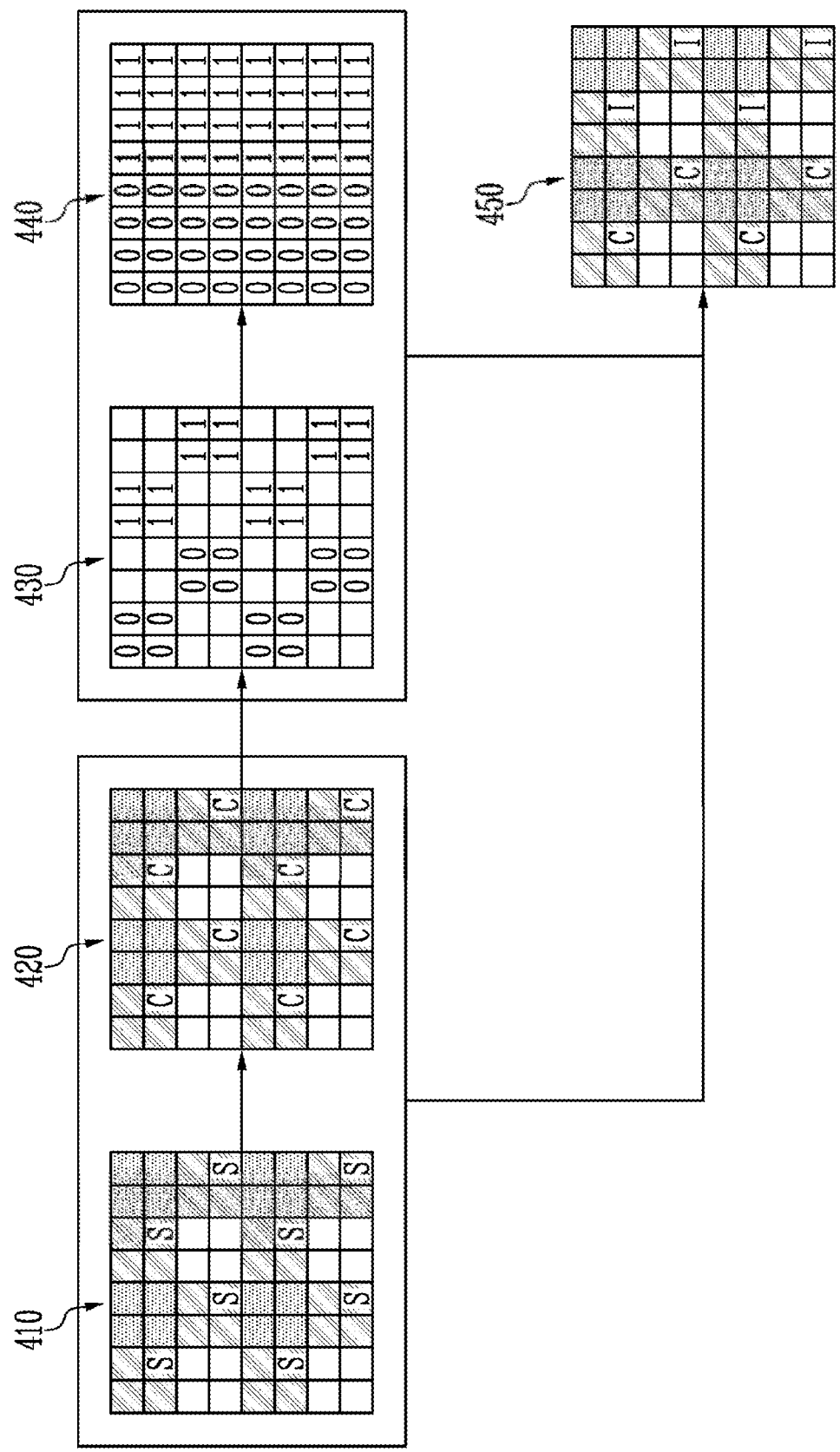
FIG. 3 is a diagram illustrating an image processing operation of a processor in accordance with an embodiment of the present disclosure.

FIG. 3 is a diagram illustrating an image processing operation of the processor in accordance with an embodiment of the present disclosure.

Referring to FIG. 3, the processor 130 may acquire flag information that is included in a motion map 420 by using a short exposure pixel value S and normal pixel values, which are included in a selected region of an image, and an exposure ratio. The flag information may be information that indicates that the selected region is a motion region or a normal region.

Specifically, the processor 130 may receive the image 410 through the image sensor 110 or the communication interface 130. The image 410 may include normal pixel values that are sensed during a first exposure time and short exposure pixel values S sensed during a second exposure time that is shorter than the first exposure time.

Also, the processor 130 may acquire a correction image 420 with correction pixel values C that are corrected from the short exposure pixel values S that are included in the image 410. The correction image 420 may include the normal pixel values that are included in the image 410 and the correction pixel values C. That is, the correction image 420 may be one in which the short exposure pixel values S that are included in the image 410 are replaced with the correction pixel values C. Regions of the image 410 may respectively correspond to those of the correction image 420. The unit of a region described in the present disclosure may be a region with pixel values, among pixel values that are included in the image 410 or the correction image 420, which have the same color and are consecutively arranged. The size of each region may represent the number of pixel values that are arranged in row and column directions. For example, the size of each region may be 2×2, 3×3 or the like.

Also, the processor 130 may acquire flag information that indicates that a selected region of the correction image 420 is a motion region or a normal region by using normal pixel values and a correction pixel value C, which are included in the selected region. The flag information may be included in the motion map 430. For example, when the flag information has a value of 1, this may represent that the selected region is a motion region. When the flag information has a value of 0, this may represent that the selected region is a normal region.

Also, the processor 130 may acquire flag information on a null region to be included in a final motion map 440 by using the flag information on the selected region, which is included in the motion map 430. The motion map 430 may include a plurality of regions respectively corresponding to a plurality of regions of the image 410 or the correction image 420. The selected region may represent a region, among the plurality of regions of the image 410, including a short exposure pixel value S or a region, among the plurality of regions of the correction image 420, including a correction pixel value C. The null region may represent a region, among the plurality of regions of the image 410, without the short exposure pixel value S or a region, among the plurality of regions of the correction image 420, without the correction pixel value C.

Also, the processor 130 may output a restoration image 450 by using the image 410 and the final motion map 440. The correction image 420 may be used instead of the image 410. The motion map 420 may be used instead of the final motion map 440.

For example, the processor 130 may determine whether the selected region of the image 410 is a motion region or a normal region by using the flag information that is included in the final motion map 440.

The processor 130 may acquire a first restoration pixel value I by using a short exposure pixel value S that is included in a motion region of the image 410 according to a first manner. The first manner is a method of interpolating peripheral pixel values of the short exposure value S that is included in the motion region.

Also, the processor 130 may acquire a second restoration pixel value C by using a short exposure pixel value S that is included in a normal region of the image according to a second manner. The second manner may be a method of calculating a value that is obtained by multiplying the short exposure pixel value S that is included in the normal region by an exposure ratio. That is, the second restoration pixel value C that is included in the normal region may be a value equal to a correction pixel value C that is included in a normal region of the correction image 420.

Also, the processor 130 may acquire the restoration image 450 with the first restoration pixel value I of the motion region or the second restoration pixel value C of the normal region. The restoration image 450 may include the first restoration pixel value I or the second restoration pixel value C, and the normal pixel values that are included in the image 410. That is, the restoration image 450 may be one in which the short exposure pixel values S that are included in the image 410 are replaced with the first restoration pixel value I or the second restoration pixel value C. Alternatively, the restoration image 450 may be one in which a correction pixel value C, among the correction pixel values C included in the correction image 420, included in a motion region, is replaced with the first restoration pixel value I.

Figure 4:
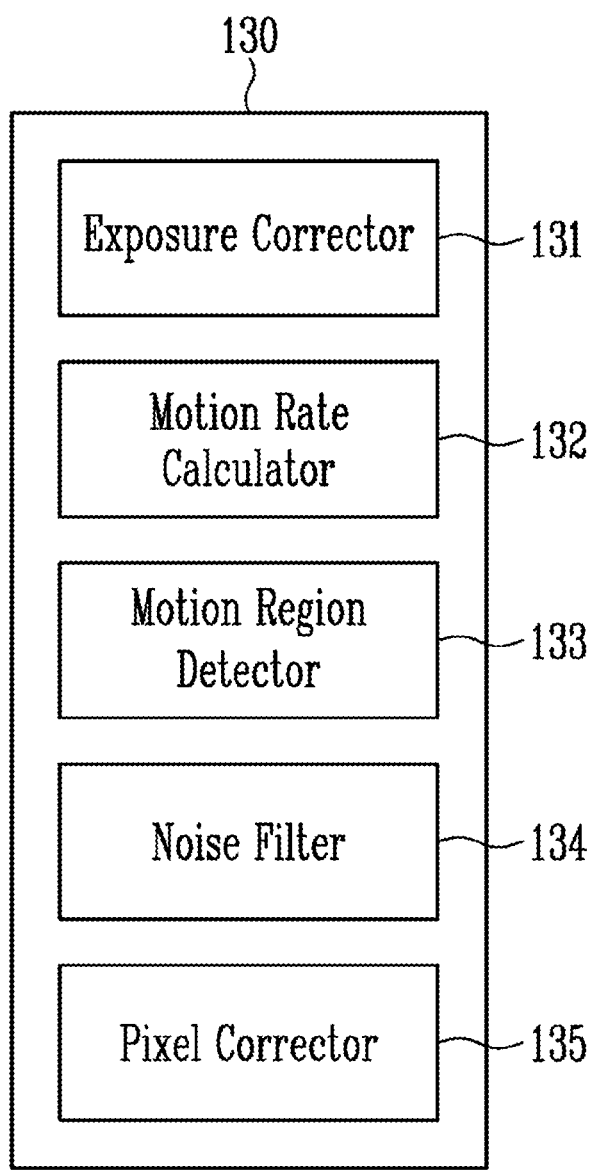
FIG. 4 is a diagram illustrating a detailed configuration of the processor in accordance with an embodiment of the present disclosure.

FIG. 4 is a diagram illustrating a detailed configuration of the processor in accordance with an embodiment of the present disclosure.

Referring to FIG. 4, the processor 130 may include at least one of an exposure corrector 131, a motion rate calculator 132, a motion region detector 133, a noise filter 134, and a pixel corrector 135.

In an embodiment, each of the exposure corrector 131, the motion rate calculator 132, the motion region detector 133, the noise filter 134, and the pixel corrector 135 may be implemented as a software module that includes an instruction, a program, and the like, which the processor 130 performs. The processor 130 or the electronic apparatus 100 may further include a memory which stores the software module. In an embodiment, each of the exposure corrector 131, the motion rate calculator 132, the motion region detector 133, the noise filter 134, and the pixel corrector 135 may be implemented as hardware such as a logic circuit, a part, an ISP, a DSP, an AP, a CPU, or a GPU.

The exposure corrector 131 may acquire correction pixel values by using the short exposure pixel values and an exposure ratio. The exposure ratio may be a ratio of a first exposure time of normal pixel values to a second exposure time of the short exposure pixel values. The exposure corrector 131 may acquire, as the correction pixel values, a value that is obtained by multiplying the short exposure pixel values by the exposure ratio. Also, the exposure corrector 131 may acquire a correction image including the correction pixel values and the normal pixel values. This will be described in more detail with reference to FIG. 6.

The motion rate calculator 132 may acquire a motion rate with respect to each of a plurality of regions of the correction image. For example, the motion rate calculator 132 may select, as a selected region, any one region, among the plurality of regions of the correction image. The selected region may be a region, among the plurality of regions of the correction image, including a short exposure pixel value. The motion rate calculator 132 may acquire a motion rate with respect to the selected region by using normal pixel values and at least one short exposure pixel value, which are included in the selected region.

In an embodiment, the motion rate calculator 132 may acquire a motion rate that represents a rate of an average value of the normal pixel values that are included in the selected region and an average value of a correction pixel value that is included in the selected region.

The motion region detector 133 may determine whether the selected region of the correction image, among the plurality of regions of the correction image, is a motion region or a normal region based on the motion rate with respect to the selected region. The selected region may be a region, among the plurality of regions of the correction image, including a short exposure pixel value. The motion region detector 133 may acquire flag information that indicates that the selected region, among the plurality of regions of the correction image, is one of the motion region and the normal region based on the motion rate with respect to the selected region. A set of flag information on respective selected regions, among the plurality of regions, may be the motion map 430, shown in FIG. 3.

In an embodiment, when a magnitude value of a difference between the motion rate and a first reference value exceeds a second reference value, the motion region detector 133 may acquire flag information with a first value that indicates that the selected region is the motion region. In an embodiment, when the magnitude value of the difference between the motion rate and the first reference value is equal to or smaller than the second reference value, the motion region detector 133 may acquire flag information with a second value that indicates that the selected region is the normal region. The first value may be 1 and the second value may be 0. However, this is merely an embodiment, and the first value and the second value may be modified and embodied as various values. This will be described in more detail with reference to FIGS. 7A and 7B.

Meanwhile, the first reference value and the second reference value may be pre-stored in the memory that is included in the processor 130 or the electronic apparatus 100. For example, the first reference value may be 1, and the second reference value may be 0.3. However, this is merely an embodiment, and the first reference value and the second reference value may be modified and embodied as various values.

The motion region detector 133 may acquire flag information on a null region by using flag information on a peripheral region of the null region. The null region may be a region, among a plurality of regions, in which any flag information does not exist. That is, the null region may be a region, among the plurality of regions of the image 410, without any short exposure pixel value. A set of flag information on the respective plurality of regions may be the final motion map 440, shown in FIG. 3.

Specifically, the motion region detector 133 may allow a central region of a kernel to correspond to the null region. For example, the motion region detector 133 may align the kernel such that the central region of the kernel is located on the null region. The kernel may include a plurality of regions that are arranged according to a predetermined arrangement form. For example, the kernel may include the central region and peripheral regions, which are arranged according to a cross arrangement form.

The motion region detector 133 may acquire flag information that indicates that the null region is one of the motion region and the normal region according to a value of the flag information that is included in regions, among the plurality of regions, corresponding to peripheral regions of the central region that is included in the kernel. This will be described in more detail with reference to FIGS. 8A to 8C.

The noise filter 134 may remove noise by using a kernel in the final motion map 440, shown in FIG. 3. The kernel may include a plurality of regions that are arranged according to a predetermined arrangement form. For example, the kernel may include a central region and peripheral regions, which are arranged according to a cross arrangement form.

Specifically, the noise filter 134 may allow the central region of the kernel to correspond to flag information that indicates that the selected region, among the plurality of regions, is the motion region. The noise filter 134 may maintain the flag information that is included in a motion flag region or change the flag information that is included in the motion flag region to the flag information that indicates that the selected region is the normal region, according to the value of the flag information that indicates regions, among the plurality of regions, corresponding to the peripheral regions of the kernel and a motion region that is included in the motion flag region. This will be described in more detail with reference to FIGS. 9A to 9C.

The pixel corrector 135 may acquire restoration pixel values for correcting the short exposure pixel values. The pixel corrector 135 may acquire and output a restoration image including the restoration pixel values.

Specifically, when the flag information represents that the selected region is the motion region, the pixel corrector 135 may acquire a first restoration pixel value for correcting a short exposure pixel value by using peripheral pixel values of the short exposure pixel value.

In an embodiment, when the flag information represents that the selected region is the motion region, the pixel corrector 135 may select normal pixel values, among the normal pixel values, of the same color as a short exposure pixel value that is included in the selected region. The pixel corrector 135 may acquire, as the first restoration pixel value, a value according to a weight sum of distances between peripheral normal pixel values, among the selected normal pixel values, located closest in plurality of directions to the short exposure pixel value, and the short exposure pixel value, and the peripheral normal pixel values.

The plurality of directions may include an upper direction, a lower direction, a left direction, and a right direction.

In an embodiment, when a first pixel value, among the selected normal pixel values, located closest in any one of the plurality of directions to the short exposure pixel value does not exist, the pixel corrector 135 may acquire, as the first pixel value, a second pixel value that is located closest in an opposite direction to the one direction to the short exposure pixel value.

Meanwhile, when the flag information represents that the selected region is the normal region, the pixel corrector 135 may acquire, as a second restoration pixel value, a value that is obtained by multiplying the short exposure pixel value that is included in the selected region by the exposure ratio. An operation of the pixel corrector 135 will be described in more detail with reference to FIGS. 10A to 10C.

FIG. 5A is a diagram illustrating an image in accordance with an embodiment of the present disclosure.

Referring to FIG. 5A, the image 510 may include a plurality of pixel values. The plurality of pixel values may be divided into normal pixel values and short exposure pixel values according to exposure times. The plurality of pixel values may be divided into Gr pixel values Gr1, Gr2, Gr3, and Gr4, R pixel values R1, R2, R3, and R4, B pixel values B1, B2, B3, and B4, and Gb pixel values Gb1, Gb2, Gb3, and Gb4 according to colors. An arrangement of the plurality of pixel values that are included in the image 510 may be determined according to an arrangement form of the pixels of the image sensor 110.

The image 510 may include a plurality of Bayer regions. The plurality of Bayer regions may be repeatedly arranged according to the number of the pixel values that are arranged in row and column directions, which are included in the image 510. Any one Bayer region 10 will be described in that the same description can be applied to each of the plurality of Bayer regions.

The Bayer region 10 may include a plurality of regions. Each of the plurality of regions may be a region with pixel values that have the same color. For example, the Bayer region 10 may include first to fourth regions. The first region may include Gr pixel values Gr1, Gr2, Gr3, and Gr4 that represent a green color. The second region may include R pixel values R1, R2, R3, and R4 that represent a red color. The third region may include B pixel values B1, B2, B3, and B4 that represent a blue color. The fourth region may include Gb pixel values Gb1, Gb2, Gb3, and Gb4 that represent the green color. The first region with the Gr pixel values Gr1, Gr2, Gr3, and Gr4 that represent the green color and the fourth region with the Gb pixel values Gb1, Gb2, Gb3, and Gb4 that represent the green color may be located in a diagonal direction.

The Bayer region 10 may include normal pixel values and short exposure pixel values. The normal pixel values may be pixel values that are sensed during a first exposure time ET_N, and the short exposure pixel values may be pixel values that are sensed during a second exposure time ET_S shorter than the first exposure time ET_N.

In an embodiment, the number of short exposure pixel values ET_S that are included in the image 510 may be smaller than that of normal pixel values ET_N that are included in the image 510. For example, any one region 11, among a plurality of regions that are included in one Bayer region 10, may include three normal pixel values 11n and one short exposure pixel value 11s. This is for the purpose of reducing noise by limiting the number of the short exposure pixel values ET_S since it is highly likely that the noise will occur due to a short exposure time of the short exposure pixel values ET_S.

In an embodiment, first regions and fourth regions, among the plurality of regions that are included in the image 510, may include at least one short exposure pixel value ET_S. The first regions and the fourth regions may include a plurality of normal pixel values that are arranged at the other positions except the short exposure pixel value ET_S. The short exposure pixel value ET_S may be arranged at the same position in the first regions and the fourth regions. However, this is merely an embodiment, and the number and arrangement position of the short exposure pixel value ET_S may be variously modified and embodied.

Figure 5B:
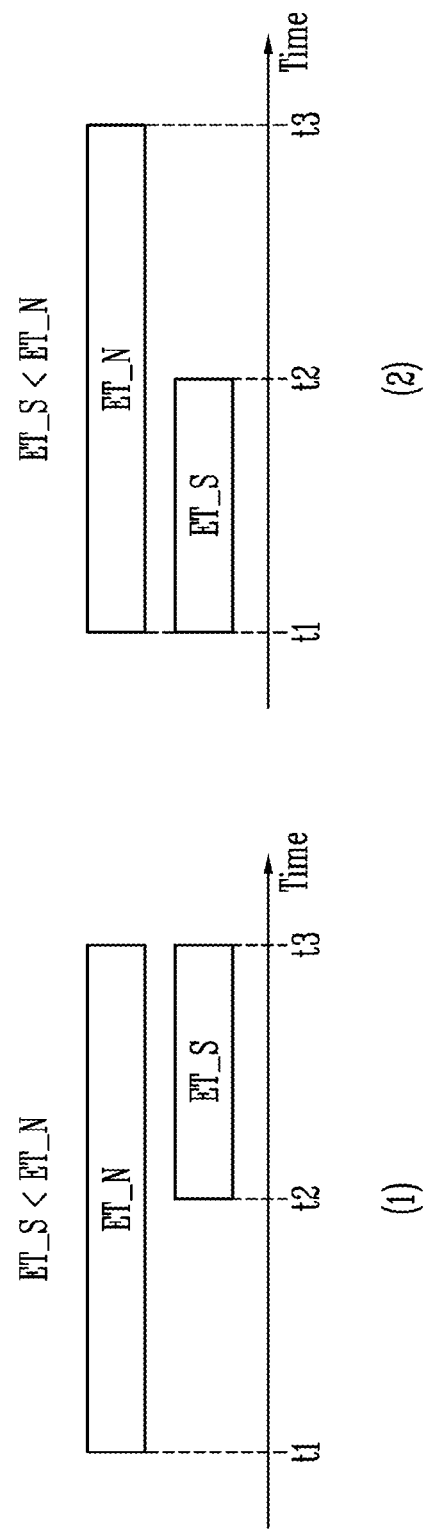
FIG. 5B is a diagram illustrating an exposure time in accordance with an embodiment of the present disclosure.

FIG. 5B is a diagram illustrating an exposure time in accordance with an embodiment of the present disclosure. FIG. 5C is a diagram illustrating an image that is acquired according to the exposure time in accordance with an embodiment of the present disclosure.

Referring to FIG. 5B, in accordance with an embodiment of the present disclosure, the first exposure time ET_N may be a longer time than the second exposure time ET_S. At least a partial time period of the first exposure time ET_N and at least a partial time period of the second exposure time ET_S may overlap with each other.

Referring to (1) of FIG. 5B, in accordance with an embodiment, the first exposure time ET_N may be a time period from a first time t1 to a third time t3. The first time t1 may be a time at which a first pixel to which the first exposure time ET_N is set starts a sensing operation that senses an optical signal, and the third time t3 may be a time at which the first pixel ends the sensing operation.

The second exposure time ET_S may be a time period from the second time t2 to the third time t3. The second time t2 may be a time at which a second pixel to which the second exposure time ET_S is set starts a sensing operation that senses an optical signal, and the third time t3 may be a time at which the second pixel ends the sensing operation. That is, the first pixel may start the sensing operation earlier than the second pixel, and then the second pixel may start the sensing operation. Subsequently, the first pixel and the second pixel may simultaneously end the sensing operations.

Referring to (2) of FIG. 5B, in accordance with an embodiment, the first exposure time ET_N may be a time period from the first time t1 to the third time t3. The second exposure time ET_N may be a time period from the first time t1 to the second time t2. That is, the first pixel and the second pixel may simultaneously start the sensing operations. Subsequent, the second pixel may end the sensing operation earlier than the first pixel. Subsequently, the first pixel may end the sensing operation. Meanwhile, the above-described embodiments are merely embodiments, the start time and end time of the sensing operation may be variously modified and embodied.

In accordance with an embodiment of the present disclosure, the image sensor 110 may acquire an image including normal pixel values that are sensed for the first exposure time ET_N and short exposure pixel values that are sensed for the second exposure time ET_S. The processor 130 may acquire a normal image with respect to the first exposure time ET_N by inputting the normal pixel values to a deep learning model. Also, the processor 130 may acquire a short exposure image with respect to the second exposure time ET_S by inputting the short exposure pixel values to the deep learning model. The deep learning model may be an artificial intelligence model that learns to output an image by using pixel values.

For example, referring to (1) of FIG. 5B, it is assumed that the first exposure time ET_N is a time period from the first time t1 to the third time t3, the second exposure time ET_S is a time period from the second time t2 to the third time t3, and an object moves from the left to the right from the first time t1 to the third time t3. Referring to (1) and (2) of 5C, a short exposure image 530 and a normal image 550 may be acquired from one image through the deep learning model.

The short exposure image 530 may include a first region 531, a second region 533, a third region 535, and a fourth region 537. The third region 535 may represent a region in which the object is located for the second exposure time ET_S from the second time t2 to the third time t3. That is, the third region 535 may include pixel values that represent the object. The first region 531, the second region 533, and the fourth region 537 may include pixel values that represent another object that is sensed during the second exposure time ET_S.

The normal image 550 may include a first region 551, a second region 553, a third region 555, and a fourth region 557. The first region 551 to the third region 555 may represent a region in which the object is located for the first exposure time ET_N from the first time t1 to the third time t3. That is, the first region 551 to the third region 555 may include pixel values that represent the object.

The processor 130 may determine a region in which the object is located during a specific time period based on a difference between regions that correspond to the short exposure image 530 and the normal image 550. The specific time period may be from the first time t1 to the second time t2 in which the first exposure time ET_N and the second exposure time ET_S do not overlap with each other. The processor 130 may determine a region in which the object is located during a time period from the second time t2 to the third time t3 through the short exposure image 530. The processor 130 may determine a direction in which the object moves through a change in region in which the object is located for each time. That is, the processor 130 may determine a movement direction of the object that is included in a current image. The movement direction of the object that is included in the current image may be used to determine which region and direction the object that is included in a next image is to move in. The current image and the next image may be consecutive images, among a plurality of images, sequentially acquired according to time, such as a moving image. As described above, the accuracy for detecting a region in which the object is located in the next image or a region in which a motion of the object occurs can be improved.

FIG. 5D is a diagram illustrating an image in accordance with an embodiment of the present disclosure.

(1) and (2) of FIG. 5D illustrate a Bayer region of an image. Referring to (1) and (2) of FIG. 5D, in accordance with an embodiment of the present disclosure, the image may include a plurality of regions. Each of the plurality of regions may include pixel values having the same color.

Referring to (1) of FIG. 5D, in accordance with an embodiment of the present disclosure, each region of the image may include pixel values of 2×2. Each region of the image may include pixel values that are sensed during a first exposure time ET_1 to a fourth exposure time ET_4. For example, in each region of the image, pixel values at a position (1, 1) may correspond to a value that is sensed for the first exposure time ET_1, pixel values at a position (1, 2) may correspond to a value that is sensed for the second exposure time ET_2, pixel values at a position (2, 1) may correspond to a value that is sensed for the third exposure time ET_3, and pixel values at a position (2, 2) may correspond to a value that is sensed for the fourth exposure time ET_4. The first exposure time ET_1 to the fourth exposure time ET_4 may all be different times, or some of the first exposure time ET_1 to the fourth exposure time ET_4 may be different times.

Referring to (2) of FIG. 5D, in accordance with an embodiment of the present disclosure, each region of the image may include pixel values of 3×3. Each region of the image may include pixel values that are sensed during a first exposure time ET_1 to a ninth exposure time ET_9. For example, in each region of the image, pixel values at a position (1, 1) to pixel values at a position (3, 3) may correspond to a value that is sensed for the first exposure time ET_1 to the ninth exposure time ET_9. The first exposure time ET_1 to the ninth exposure time ET_9 may all be different times, or some of the first exposure time ET_1 to the ninth exposure time ET_9 may be different times. Meanwhile, the above-described embodiment is merely an embodiment, and the color of the pixel values and the arrangement according to exposure time may be variously modified and embodied.

FIG. 6 is a diagram illustrating an operation of the exposure corrector in accordance with an embodiment of the present disclosure. FIG. 6 illustrates an image 610 received from the image sensor 110 or the communication interface 120.

Referring to (1) and (2) of FIG. 6, the exposure corrector 131 may acquire a correction image 620 that is corrected from the image 610 by using an exposure ratio. The image 610 may include Bayer regions that are repeatedly arranged along row and column directions. The Bayer region may include a first region to a fourth region. The first region may include pixel values at (1, 1) to (2, 2), the second region may include pixel values at (1, 3) to (2, 4), the third region may include pixel values at (3, 1) to (4, 2), and the third region may include pixel values at (3, 3) to (4, 4). The Bayer region may include a short exposure pixel value that is located at (2, 2), a short exposure pixel value that is located at (4, 4), and normal pixel values at the other positions.

The exposure corrector 131 may acquire correction pixel values 621C and 622C that are corrected from short exposure pixel values 611S and 612S that are included in the image 610 by using the exposure ratio. Also, the exposure corrector 131 may acquire the correction image 620 with the correction pixel values 621C and 622C and the normal pixel values.

For example, the exposure corrector 131 may acquire, as the correction pixel values 621C and 622C, a value that is obtained by multiplying the short exposure pixel values 611S and 612S by the exposure ratio. The exposure ratio may be a ratio of a first exposure time ET_N to a second exposure time ET_S, the second exposure time ET_S being shorter than the first exposure time ET_N. For example, as shown in (2) of FIG. 6, the exposure ratio may be a value that is obtained by dividing the first exposure time ET_N by the second exposure time ET_S.

FIG. 7A is a diagram illustrating operations of the motion rate calculator and the motion region detector in accordance with an embodiment of the present disclosure.

Referring to (1) and (2) of FIG. 7A, the motion rate calculator 132 may acquire a motion rate 721R or 722R with respect to a selected region 711C or 712C, among a plurality of regions of a correction image 710.

Specifically, the motion rate calculator 132 may acquire the motion rate 721R or 722R with respect to the selected region 711C or 712C by using normal pixel values PV and a correction pixel value cPV, which are included in the selected region 711C or 712C. To this end, the motion rate calculator 132 may select, as the selected region 711C or 712C, a region, among the plurality of regions of the correction image 710, including the correction pixel value.

In an embodiment, the motion rate calculator 132 may acquire, as a motion rate, a rate of an average value of the normal pixel values PV that are included in the selected region 711C or 712C and an average value of the correction pixel value cPV that is included in the selected region 711C or 712C. For example, as shown in (2) of FIG. 7A, the motion rate 721R or 722R may be a value that is obtained by dividing the average value of the normal pixel values PV that are included in the selected region 711C or 712C by the average value of the correction pixel value cPV that is included in the selected region 711C or 712C.

In another embodiment, the motion rate calculator 132 may acquire, as the motion rate 721R or 722R, a rate of a median value of the normal pixel values PV that are included in the selected region 711C or 712C and a median value of the correction pixel value cPV that is included in the selected region 711C or 712C. The median value may mean a value, among a plurality of values, aligned at the most central position when the plurality of values are aligned in a magnitude order. In another embodiment, the motion rate calculator 132 may acquire, as the motion rate 721R or 722R, a rate of a maximum frequency value of the normal pixel values PV that are included in the selected region 711C or 712C and a maximum frequency value of the correction pixel value cPV that is included in the selected region 711C or 712C.

Meanwhile, the motion rate calculator 132 may generate a data set 720 with the motion rate 721R or 722R with respect to the selected region 711C or 712C. A plurality of regions that are included in the data set 720 and the plurality of regions that are included in the correction image may correspond to each other at the same positions. Meanwhile, the data set 720 may include null values with respect to unselected regions. The null values may represent a state in which no motion rate exists. The unselected regions may be regions, among the plurality of regions of the correction image 710, without the correction pixel value cPV.

Referring to (2) and (3) of FIG. 7A, the motion region detector 133 may determine whether the selected region 711C or 712C of the correction image 710 is a motion region or a normal region, based on the motion rate 721R or 722R with respect to the selected region 711C or 712C of the correction image 710, and acquire flag information 731F or 732F that indicates that the selected region 711C or 712C is one of the motion region and the normal region. The flag information 731F or 732F may include one of a first value and a second value. The first value may be 1, representing the motion region. The second value may be 0, representing the normal region. However, this is merely an embodiment, and the first value and second value may be variously modified and embodied.

In an embodiment, when a magnitude value of a difference between a motion rate 721R with respect to a first selected region 711C and a first reference value is equal to or smaller than a second reference value, the motion region detector 133 may acquire flag information 731F with the second value that indicates that the first selected region 711C is the normal region.

In an embodiment, when a magnitude value of a difference between a motion rate 722R with respect to a second selected region 712C and the first reference value exceeds the second reference value, the motion region detector 133 may acquire flag information 732F with the first value that indicates that the second selected region 712C is the motion region.

For example, the first reference value may be 1, and the second reference value may be 0.3 or 0.5. However, this is merely an embodiment, and the first reference value and the second reference value may be modified and embodied as various values.

Meanwhile, the motion region detector 133 may generate a motion map 730 with the flag information 731F and 732F on the selected region 711C and 712C. A plurality of regions that are included in the motion map 730 and the plurality of regions that are included in the correction image 710 may correspond to each other at the same positions. Meanwhile, the motion map 730 may include null values with respect to unselected regions. The null values may represent a state in which no flag information exists. The unselected regions may be regions, among the plurality of regions of the correction image 710, without the correction pixel value cPV. A region that corresponds to an unselected region, among the plurality of regions of the motion map 730, and includes a null value may be designated as a null region.

Figure 7B:
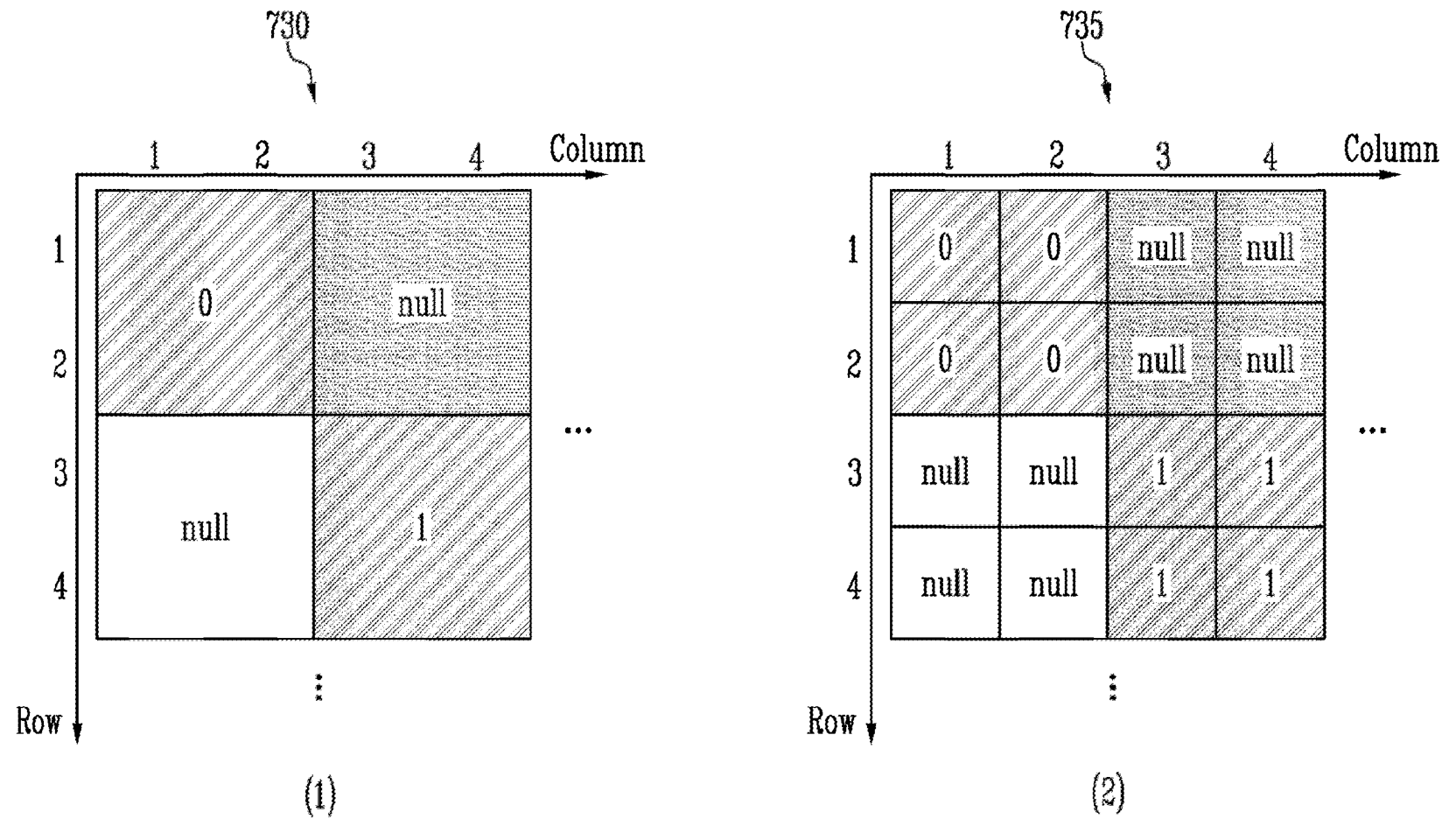

FIG. 7B is a diagram illustrating a form of flag information in accordance with an embodiment of the present disclosure.

Referring to (1) of FIG. 7B, in accordance with an embodiment, the motion map 730 may include one flag information that corresponds to each region with pixel values that have the same color. The one flag information that is included in the corresponding region may be commonly applied to the pixel values that are included in the corresponding region. Referring to (2) of FIG. 7B, in accordance with an embodiment, a motion map 735 may include one flag information corresponding to each pixel value. That is, the flag information may exist in units of regions or exist in units of pixel values.

Figure 8C:
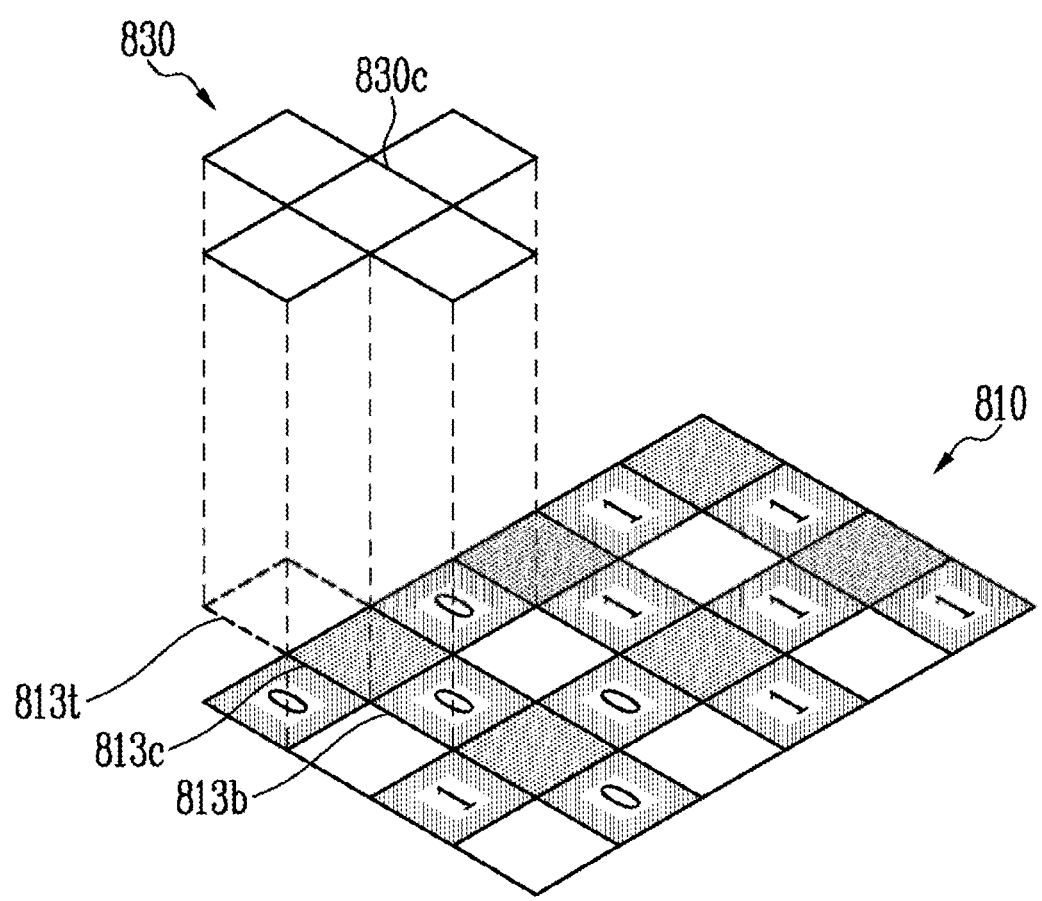
FIG. 8C is a diagram illustrating an operation of the motion region detector in accordance with an embodiment of the present disclosure.

FIGS. 8A to 8C are diagrams illustrating operations of the motion region detector in accordance with embodiments of the present disclosure.

Referring to FIG. 8A, the motion region detector 133 may generate a motion map 850 with flag information on a null region 811c from a motion map 810 by using a first kernel 830. The motion map 850 may be one in which the flag information is filled in the null region 811c of the motion map 810. That is, even a region, among a plurality of regions that are included in an image, without any short exposure pixel value may be filled with flag information that indicates that the corresponding region is a motion region or a normal region.

Specifically, the motion region detector 133 may allow a central region 830c of the first kernel 830 to correspond to the null region 811c of the motion map 810. For example, the motion region detector 133 may align the first kernel 830 such that the null region 811c of the motion map 810 and the central region 830c of the first kernel 830 overlap with each other.

The first kernel 830 may include the central region 830c and peripheral regions, which are arranged according to a predetermined arrangement form. In an embodiment, the peripheral regions of the first kernel 830 may include regions that are located closest to the central region 830c of the first kernel 830 in an upper direction, a lower direction, a left direction, and a right direction with respect to the central region 830c. The upper direction and the lower direction may be row directions, and the left direction and the right direction may be column directions. That is, the first kernel 830 may include a plurality of regions that are arranged according to a cross arrangement form. However, this is merely an embodiment, and the arrangement form and number of peripheral regions may be variously modified and embodied.

The motion region detector 133 may align the central region 830c of the first kernel 830 in the null region 811c of the motion map 810. The null region 811c may correspond to the central region 830c of the first kernel 830, and peripheral regions of the null region 811c may correspond to the peripheral regions of the first kernel 830. The null region 811c may be a region in which any flag information does not exist, and the peripheral regions of the null region 811c may include regions with flag information.

The motion region detector 133 may acquire flag information that indicates that the null region 811c of the motion map 810 is one of the motion region and the normal region according to the value of the flag information that is included in regions of the motion map 810, which correspond to the peripheral regions of the central region 830c of the first kernel 830.

For example, a peripheral region that is located in the upper direction with respect to the central region 830c of the first kernel 830 may correspond to a region that is located in the upper direction with respect to the null region 811c of the motion map 810. A peripheral region that is located in the lower direction with respect to the central region 830c of the first kernel 830 may correspond to a region that is located in the lower direction with respect to the null region 811c of the motion map 810. A peripheral region that is located in the left direction with respect to the central region 830c of the first kernel 830 may correspond to a region that is located in the left direction with respect to the null region 811c of the motion map 810. A peripheral region that is located in the right direction with respect to the central region 830c of the first kernel 830 may correspond to a region that is located in the right direction with respect to the null region 811c of the motion map 810.

In accordance with an embodiment, when the number of first values of the flag information that is included in the regions of the motion map 810, which correspond to the peripheral regions of the central region 830c of the first kernel 830, exceeds a reference number, the motion region detector 133 may acquire flag information that indicates that the null region 811c of the motion map 810 is the motion region.

In accordance with an embodiment, when the number of first values of the flag information that is included in the regions of the motion map 810, which correspond to the peripheral regions of the central region 830c of the first kernel 830, is equal to or smaller than the reference number, the motion region detector 133 may acquire flag information that indicates that the null region 811c of the motion map 810 is the normal region.

The first value of the flag information may represent that a corresponding region of the motion map 810 is the motion region, and a second value of the flag information may represent that a corresponding region of the motion map 810 is the normal region. That is, when the number of first values of the flag information that is included in the regions of the motion map 810, which correspond to the peripheral regions of the central region 830c of the first kernel 830, exceeds the reference number, the motion region detector 133 may fill the flag information on the null region 811c with the first value. Meanwhile, when the number of first values of the flag information that is included in the regions of the motion map 810, which correspond to the peripheral regions of the central region 830c of the first kernel 830, is equal to or smaller than the reference number, the motion region detector 133 may fill the flag information on the null region 811c of the motion map 810 with the second value.

Referring to FIG. 8B, the reference number may be, for example, 1. For example, referring to (1) to (3) of FIG. 8B, when the number of first values of the flag information that is included in regions of the motion map 810, which correspond to peripheral regions of a first kernel 831, 832, or 833, exceeds 1 as the reference number, the first value of the flag information may be filled in the null region 811c of the motion map 810, which corresponds to a central region of the first kernel 831, 832, or 833. In another example, referring to (4) and (5) of FIG. 8B, when the number of first values of the flag information that is included in regions of the motion map 810, which correspond to peripheral regions of a first kernel 834 or 835, is equal to or smaller than 1 as the reference number, a second value of the flag information may be filled in the null region 811c of the motion map 810, which corresponds to a central region of the first kernel 834 or 835.

However, this is merely an embodiment, and the reference number may be variously modified and embodied as 2, 3, and the like. Also, the reference value may be determined according to the number of regions that are included in a second kernel 930.

Referring to FIG. 8C, in accordance with an embodiment, when the central region 830c of the first kernel 830 is aligned on a region that is located at an edge of the motion map 810, there may be a case in which some peripheral regions, among the peripheral regions of the first kernel 830, do not overlap with any region, among the plurality of regions of the motion map 810. Flag information that is included in a region of the motion map 810, which corresponds to another peripheral region of the first kernel 830, may be used.

In an embodiment, the motion region detector 133 may align the central region 830c of the kernel 830 on a null region 813c of the motion map 810. When any one peripheral region, among the peripheral regions of the kernel 830, does not correspond to one of the plurality of regions of the motion map 810, the motion region detector 133 may select a peripheral region that is located in an opposite direction to that of the one peripheral region, among the peripheral regions of the kernel 830. For example, when a peripheral region of the kernel 830, which is out of the motion map 810, is an upper peripheral region that is located in the upper direction with respect to the central region 830c of the kernel 830, the motion region detector 133 may select a lower peripheral region that is located in the lower direction with respect to the central region 830c of the kernel 830.

The motion region detector 133 may acquire flag information that is included in a lower peripheral region 813b of the motion map 810, which corresponds to the lower peripheral region, as flag information on an upper peripheral region 813t of the motion map 810, which corresponds to the upper peripheral region of the kernel 830. That is, when the upper peripheral region 813t that is located in the upper direction with respect to the null region 813 that corresponds to the central region 830c of the kernel 830 does not exist, the motion region detector 133 may copy the flag information on the lower peripheral region 813b located in the lower direction with respect to the null region 813c as the flag information on the upper peripheral region 813t.

Subsequently, the motion region detector 133 may acquire flag information that indicates that the null region 813c of the motion map 810 is one of the motion region and the normal region according to the value of the flag information that is included in regions of the motion map 810, which correspond to the peripheral regions of the central region 830c of the first kernel 830.

Meanwhile, referring back to FIG. 8A, the motion map 810 may include a first region 810N and a second region 810M. It is assumed that the first region 810N includes regions in which any motion of an object does not actually occur, and the second region 810M includes regions in which a motion of the object actually occur. The first region 810N may include a region with flag information that indicates that the region is a normal region and a null region without the flag information. The second region 810M may include a region with flag information that indicates that the region is a motion region and a null region without the flag information. Since a short exposure pixel value has a Signal to Noise Ratio (SNR) relatively lower than that of a normal pixel value, flag information acquired using the short exposure pixel value may not be accurate. Alternatively, the motion map 810 may include a noise region 815 with flag information that indicates that the noise region 815 is a motion region. A method of removing the noise region 815 will be described in detail with reference to FIGS. 9A to 9C.

Figure 9C:
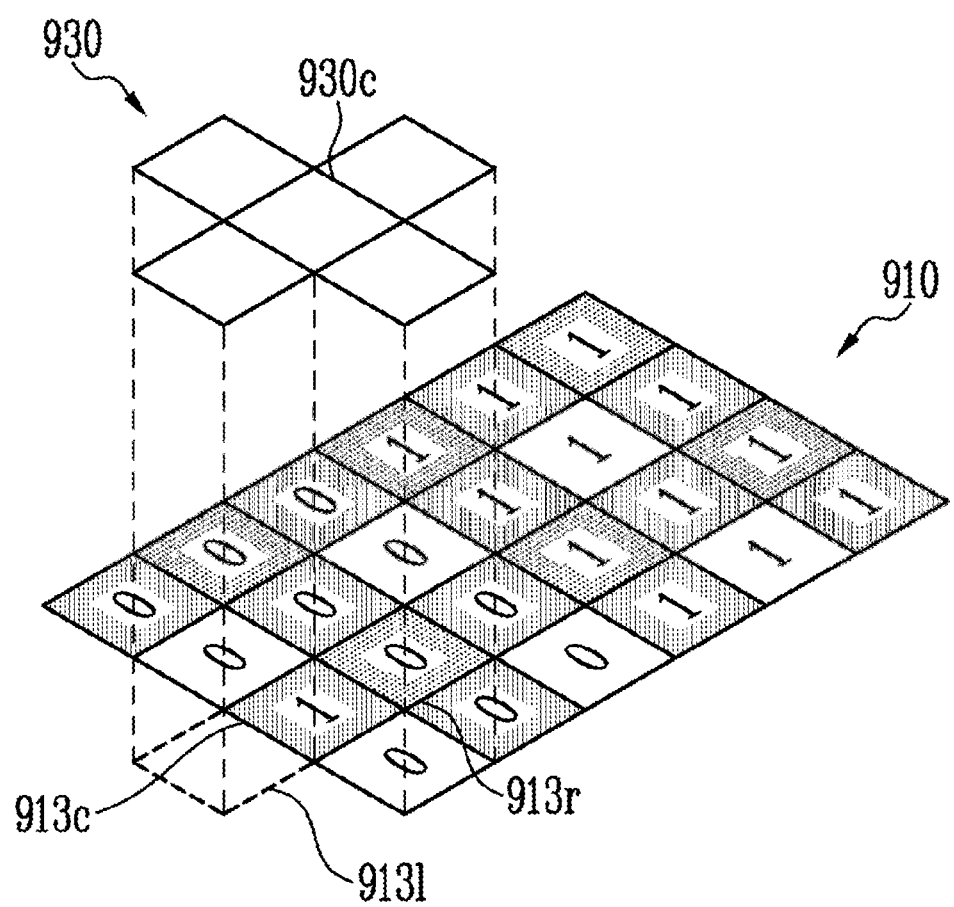
FIG. 9C is a diagram illustrating an operation of the noise filter in accordance with an embodiment of the present disclosure.

FIGS. 9A to 9C are diagrams illustrating operations of the noise filter in accordance with embodiments of the present disclosure.

Referring to FIGS. 9A to 9C, in accordance with an embodiment of the present disclosure, the noise filter 134 may remove noise from a motion map 910 by using a second kernel 930. The motion map 910 may include a first region 910N and a second region 910M. It is assumed that the first region 910N may include regions in which any motion of an object does not actually occur, and the second region 910M includes regions in which a motion of the object actually occurs. It is assumed that the first region 910N includes a noise region 915 with flag information that indicates that the noise region 915 is a motion region even though any motion of the object does not actually occur. The noise filter 134 may acquire a final motion map 950 that is corrected from the flag information on the noise region 915 of the motion map 910 by using the second kernel 930. To this end, the noise filter 134 may determine whether a motion flag region is a noise region, and correct the motion flag region as a normal flag region when it is determined that the motion flag region is the noise region. That is, when it is determined that a region with a first value of the flag information is the noise region, the value of the flag information of the corresponding region may be corrected as a second value.

Specifically, the noise filter 134 may allow a central region 930c of the second kernel 930 to correspond to a motion flag region 911c, among a plurality of regions of the motion map 910. The motion flag region 911c may be a region with flag information that indicates that the region is a motion region. For example, the motion region detector 133 may align the second kernel 930 such that the central region 930c of the second kernel 930 overlaps with the motion flag region 911c, among the plurality of regions of the motion map 910.

The second kernel 930 may include the central region 930c and peripheral regions, which are arranged according to a predetermined arrangement form. In an embodiment, the peripheral regions that are included in the second kernel 930 may include regions that are located closest to the central region 930c that is included in the second kernel 930 in an upper direction, a lower direction, a left direction, and a right direction with respect to the central region 930c. That is, the second kernel 930 may include a plurality of regions that are arranged according to a cross arrangement form. However, this is merely an embodiment, and the arrangement form and number of peripheral regions may be variously modified and embodied.

The noise filter 134 may maintain the flag information that is included in the motion flag region 911c or change the flag information that is included in the motion flag region 911c to a flag information that indicates that the flag region 911c is the normal region, according to a value of the flag information that is included in peripheral regions of the motion flag region 911c, which correspond to the peripheral regions of the central region 930c of the second kernel 930, among the plurality of regions of the motion map 910.

In accordance with an embodiment, when the number of first values of the flag information that indicates that a peripheral region of the motion flag region 911c is a motion region, which is included in the peripheral region, which corresponds to the peripheral regions of the central region 930c of the second kernel 930, among the plurality of regions of the motion map 910, exceeds a reference number, the noise filter 134 may maintain the flag information that is included in the motion flag region 911c. The flag information that is included in the motion flag region 911c may be maintained as the first value.

In accordance with an embodiment, when the number of first values of the flag information that indicates that a peripheral region of the motion flag region 911c is a motion region, which is included in a peripheral region of the motion flag region 911c, which corresponds to the peripheral regions of the central region 930c of the second kernel 930, among the plurality of regions of the motion map 910, is equal to or smaller than the reference number, the noise filter 134 may change the flag information that is included in the motion flag region 911c to flag information that indicates that the motion flag region 911c is the normal region. The flag information that is included in the motion flag region 911c may be changed from the first value to the second value.

Referring to FIG. 9B, the reference number may be, for example, 1. For example, referring to (1) to (3) of FIG. 9B, when the number of first values of the flag information that is included in peripheral regions of the motion map 910, which correspond to peripheral regions of a second kernel 931, 932 or 933, exceeds 1 as the reference number, the first value of the flag information that is included in a motion flag region corresponding to a central region of a second kernel 941, 942 or 943 may be equally maintained. In another example, referring to (4) and (5) of FIG. 9B, when the number of first values of the flag information that is included in regions of the motion map 910, which correspond to peripheral regions of a second kernel 934 or 935, is equal to or smaller than 1 as the reference number, the first value of the flag information that is included in a motion flag region corresponding to a central region of a second kernel 944 or 945 may be changed to the second value.

However, this is merely an embodiment, and the reference number may be variously modified and embodied as 2, 3, and the like. Also, the reference number may be determined according to the number of regions that are included in the second kernel 930.

Referring to FIG. 9C, in accordance with an embodiment, when the central region 930c of the second kernel 930 is aligned on a region that is located at an edge of the motion map 910, there may be a case in which some peripheral regions, among the peripheral regions of the second kernel 930, do not overlap with any region, among the plurality of regions of the motion map 910. Flag information that is included in a region of the motion map 910, which corresponds to another peripheral region of the second kernel 930, may be used.

In an embodiment, the noise filter 134 may align the central region 930c of the second kernel 930 on a motion flag region 913c of the motion map 910. When any one peripheral region, among the peripheral regions of the second kernel 930, does not correspond to one of the plurality of regions of the motion map 910, the noise filter 134 may select a peripheral region that is located in an opposite direction to that of the one peripheral region, among the peripheral regions of the second kernel 930. For example, when a peripheral region of the second kernel 930, which is out of the motion map 910, is a left peripheral region that is located in the left direction with respect to the central region 930c of the second kernel 930, the noise filter 134 may select a right peripheral region that is located in the right direction with respect to the central region 930c of the second kernel 930.

The noise filter 134 may acquire flag information that is included in a right peripheral region 913r of the motion map 910, which corresponds to the right peripheral region of the second kernel 930 as flag information on a left peripheral region 913l of the motion map 910, which corresponds to the left peripheral region of the second kernel 930. That is, when the left peripheral region 913l that is located in the left direction with respect to the motion flag region 913c that corresponds to the central region 930c of the second kernel 930 does not exist, the noise filter 134 may copy flag information on the right peripheral region 913r located in the right direction with respect to the motion flag region 913c as flag information on the left peripheral region 193l.

Subsequently, the noise filter 134 may maintain the flag information that is included in the motion flag region 911c or change the flag information that is included in the motion flag region 911c to flag information that indicates that the motion flag region 911 is the normal region, according to the value of the flag information that is included in peripheral regions of the motion map 910, which correspond to the peripheral regions of the central region 930c of the second kernel 930.

Figure 10C:
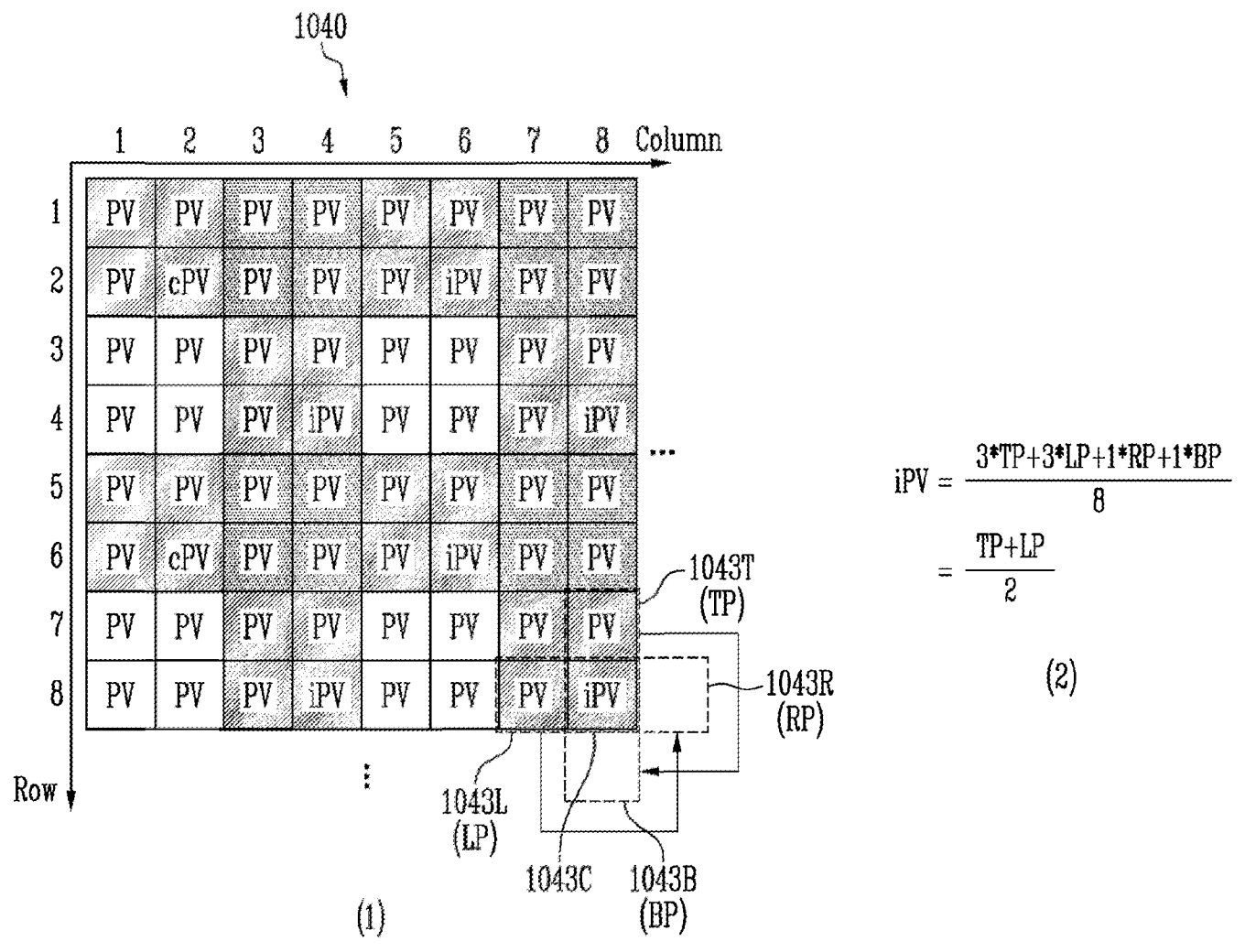

FIGS. 10A to 10C are diagrams illustrating operations of the pixel corrector in accordance with embodiments of the present disclosure.

Referring to FIGS. 10A and 10B, in accordance with an embodiment of the present disclosure, the pixel corrector 125 may acquire a restoration image 1030 by using an image 1010 and a motion map 1020.

The image 1010 may be an image in a state with short exposure pixel values sPV or a state with correction pixel values that are corrected from the short exposure pixel values sPV. The motion map 1020 may be a motion map in a state with a null region in which flag information does not exist, a state without the null region, or a state in which a noise region is removed. Hereinafter, it is assumed and described that the image 1010 is an image in a state with short exposure pixel values sPV, and the motion map 1020 is a motion map in a state in flag information is filled in a null region, i.e., a state without the null region. Meanwhile, the motion map 1020 shown in (2) of FIG. 10A represents a state with corresponding flag information in units of pixel values. However, this is merely an embodiment, and the motion map 1020 may be implemented in a form with flag information in units of regions. The restoration image 1030 may include normal pixel values and restoration pixel values. The restoration image 1030 may be an image in which the short exposure pixel values that are included in the image are replaced with the restoration pixel values.

Specifically, the pixel corrector 135 may acquire a restoration pixel value iPV or cPV that is corrected from a short exposure pixel value sPV that is included in the image 1010, based on the flag information that is included in the motion map 1020. For example, the pixel corrector 135 may acquire the restoration pixel value iPV or cPV that is corrected from the short exposure pixel value sPV according to a first manner or a second manner, based on flag information having the same position as the short exposure pixel value sPV. Alternatively, the pixel corrector 135 may acquire the restoration pixel value iPV or cPV that is corrected from a short exposure pixel value sPV that is included in a selected region according to the first manner or the second manner, based on flag information on the same region as the selected region with the short exposure pixel value sPV.

The image 1010 may include a plurality of regions. For example, each region may include pixel values that are arranged according to an arrangement of 2×2. Each region may include pixel values of the same color.

The pixel corrector 135 may select, as a selected region, a region with a short exposure pixel value sPV. For example, a region with a first short exposure pixel value 1011C may be selected as a first selected region, and a region with a second short exposure pixel value 1013C may be selected as a second selected region. For example, the first selected region may be a region with pixel values that are arranged at positions of (3, 3) to (4, 4), and the second selected region may be a region with pixel values that are arranged at positions of (5, 5) to (6, 6).

In an embodiment, when flag information 1021C on the first selected region has a first value that indicates a motion region, the pixel corrector 135 may acquire a first restoration pixel value 1031C that is corrected from the first short exposure pixel value 1011C that is included in the first selected region by using a peripheral pixel value of the first short exposure pixel value 1011C.

In a specific embodiment, when the flag information 1021C on the first selected region has the first value that indicates the motion region, the pixel corrector 135 may select normal pixel values, among normal pixel values PV, having the same color as the first short exposure pixel value 1011C. For example, when the first short exposure pixel value 1011C has a green color, normal pixels having the green color may be selected.

Also, the pixel corrector 135 may acquire, as the first restoration pixel value 1031C, a value according to a weight sum of distances between peripheral normal pixel values, among the selected normal pixel values, located closest in a plurality of directions to the first short exposure pixel value 1011C, and the first short exposure pixel value 1011C, and the peripheral normal pixel values.

For example, referring to FIGS. 10A and 10B, the peripheral normal pixel values may include an upper pixel value 1031T located in an upper direction, a lower pixel value 1031B in a lower direction, a left pixel value 1031L located in a left direction, and a right pixel value 1031R located in a right direction, with respect to the first short exposure pixel value 1011C.

The pixel corrector 135 may determine a first weight value of the upper pixel value 1031T according to a distance between the upper pixel value 1031T and the first short exposure pixel value 1011C. The pixel corrector 135 may determine a second weight value of the lower pixel value 1031B according to a distance between the lower pixel value 1031B and the first short exposure pixel value 1011C. The pixel corrector 135 may determine a third weight value of the left pixel value 1031L according to a distance between the left pixel value 1031L and the first short exposure pixel value 1011C. The pixel corrector 135 may determine a fourth weight value of the right pixel value 1031R according to a distance between the right pixel value 1031R and the first short exposure pixel value 1011C. Each weight may be determined as a value which becomes smaller as the distance increases. In addition, as shown in (3) of FIG. 10B, the pixel corrector 135 may acquire, as the first restoration pixel value 1031C, a value according to a sum of a value that is obtained by multiplying the upper pixel value 1031T by the first weight value, a value that is obtained by multiplying the lower pixel value 1031B by the second weight value, a value that is obtained by multiplying the left pixel value 1031L by the third weight value, and a value that is obtained by multiplying the right pixel value 1031R by the fourth weight value.

As described above, since the motion region is a region expressed as a blur due to a motion of an object, interpolation of a short exposure pixel value that is included in the motion region by using peripheral pixel values of the short exposure pixel value, may not have influence on deterioration of the quality of an image.

Meanwhile, as shown in (2) of FIG. 10B, when flag information 1023C on the second selected region has a second value that indicates a normal region, the pixel corrector 135 may acquire a second restoration pixel value 1033C that is corrected from the second short exposure pixel value 1013 that is included in the second selected region by using a value that is obtained by multiplying the second short exposure pixel value 1013C by an exposure ratio. The exposure ratio may be a ratio of a first exposure time ET_N for which a normal pixel value is sensed and a second exposure time ET_S for which a short exposure pixel value is sensed.

Referring to FIGS. 10A and 10C, in accordance with an embodiment, when flag information on a third selected region with a third short exposure pixel value represents that the third selected region is a motion region, and the third selected region is a region that is located at an edge of the image 1010, there may be a case in which any normal pixel value in a specific direction, among a plurality of directions with respect to the third short exposure pixel value, does not exist. A peripheral normal pixel value in an opposite direction to the specific direction may be used as a peripheral normal pixel value in the specific direction. The plurality of directions may include an upper direction, a lower direction, a left direction, and a right direction.

In an embodiment, when the flag information 1021C on the third selected region has the first value that indicates the motion region, the pixel corrector 135 may select normal pixel values of the same color as the third short exposure pixel value, among the plurality of pixel values, included in the third selected region. For example, the third short exposure pixel value and the selected normal pixel value may be pixel values of the green color.

Also, when any first pixel value, among the selected normal pixel values, located closest in any one direction, among the plurality of directions, to the third short exposure pixel value does not exist, the pixel corrector 135 may acquire, as the first pixel value, a second pixel value that is located closest in an opposite direction to the one direction to the third short exposure pixel value.

For example, it is assumed that the third selected region includes pixel values that are located at (7, 7) to (8, 8), and the short exposure pixel value that is included in the third selected region is located at (8, 8). The peripheral pixel values having the same color with respect to the short exposure pixel value may include an upper pixel value 1043T located at (7, 8) in the upper direction and a left pixel value 1043L located at (8, 7) in the left direction. In addition, a lower pixel value 1043B located in the lower direction with respect to the short exposure pixel value and a right pixel value 1043R located in the right direction with respect to the short exposure pixel value may not exist. The pixel corrector 135 may acquire, as the lower pixel value 1043B, the upper pixel value 1043T located in an opposite direction to that of the lower pixel value 1043B with respect to the short exposure pixel value that is included in the third selected region. Also, the pixel corrector 135 may acquire, as the right pixel value 1043R, the left pixel value 1043L located in an opposite direction to that of the right pixel value 1043R with respect to the short exposure pixel value that is included in the third selected region.

In addition, as shown in (2) of FIG. 10C, the pixel corrector 135 may determine each weight value according to a distance between each of the upper pixel value 1043T, the lower pixel value 1043B, the left pixel value 1043L, and the right pixel value 1043R, and the third short exposure pixel value, and acquire, as a third restoration pixel value 1043C, a value according to a weight sum of the weight values respectively corresponding to the upper pixel value 1043T, the lower pixel value 1043B, the left pixel value 1043L, and the right pixel value 1043R.

The motion region and the normal region can be detected while being distinguished from each other by using a short exposure pixel value, and the short exposure pixel value can be restored as an accurate pixel value through another method according to whether a region with the short exposure pixel value is the motion region or the normal region. Accordingly, an image can be restored without deterioration of the quality of the image due to pixel values having a difference between exposure times.

FIG. 11 is a diagram illustrating a method of compressing an image by using flag information in accordance with an embodiment of the present disclosure.

Referring to FIG. 11, in accordance with an embodiment of the present disclosure, the image sensor 110 may sequentially acquire a plurality of images 1110, 1120, and 1130 according to time. Each of the plurality of images 1110, 1120, and 1130 may include a region 1111, 1121, or 1131 representing an object and a region 1115, 1125, or 1135 representing a background. The object may be in a state in which the object moves in a right direction during a time period that is obtained by each of the images 1110, 1120, and 1130. In addition, each of the images 1110, 1120, and 1130 may include normal pixel values that are sensed during a first exposure time and short exposure pixel values that are sensed during a second exposure time.

The processor 130 may generate a motion map with respect to each of the images 1110, 1120, and 1130 by using the short exposure pixel value and the normal pixel values, which are included in each of the images 1110, 1120, and 1130. The motion map may include flag information that indicates that each of a plurality of regions of the images 1110, 1120, and 1130 is a motion region or a normal region.

The processor 130 may generate one video data that is obtained by compressing the images 1110, 1120, and 1130 by using the flag information that is included in the motion map with respect to each of the images 1110, 1120, and 1130. For example, the processor 130 may determine whether each of the plurality of regions of the images 1110, 1120, and 1130 is the motion region or the normal region based on the value of the flag information on each of the plurality of regions. Also, the processor 130 may generate video data by removing the other pixel values, except representative pixel values, among pixel values of the images 1110, 1120, and 1130, which are included in the normal region. As described above, the motion region and the normal region are accurately detected so that the quality of an image can be improved while improving the compression rate of data.

FIG. 12 is a diagram illustrating an operating method of an electronic apparatus in accordance with an embodiment of the present disclosure.

The operating method of the electronic apparatus 100 may include step S1210 of acquiring an image including normal pixel values that are sensed during a first exposure time and short exposure pixel values that are sensed during a second exposure time that is shorter than the first exposure time, step S1220 of acquiring flag information that indicates that a selected region, among a plurality of regions of the image, is one of a motion region and a normal region by using an exposure ratio of the first exposure time and the second exposure time and by using a short exposure pixel value and normal pixel values, which are included in the selected region, and step S1230 of outputting a restoration image including a restoration pixel value that is corrected from the short exposure pixel value that is included in the selected region, based on the flag information.

Specifically, an image may be acquired, which includes normal pixel values and short exposure pixel values (S1210). The normal pixel values may be pixel values that are sensed during a first exposure time. The short exposure pixel values may be pixel values that are sensed during a second exposure time that is shorter than the first exposure time.

In addition, flag information that indicates that a selected region, among a plurality of region of the image, is one of a motion region and a normal region by using an exposure ratio of the first exposure time and the second exposure time, and a short exposure pixel value and normal pixel values, which are included in the selected region (S1220).

Each of the plurality of regions of the image may be a region having the same size. Each of the plurality of regions may include the same number of pixel values. The selected region may be a region, among the plurality of regions, including at least one short exposure pixel value. The motion region may represent a region in which a change in pixel values according to time is large due to a motion of an object. The normal region may represent a region in which a change in pixel values according to time is small since motion of the object does not exist.

In an embodiment, a correction image may be acquired, which includes correction pixel values that are corrected from the short exposure pixel values by using the exposure ratio, and the normal pixel values. The correction image may be one in which some pixel values of the image are changed. Alternatively, the correction image may be one generated separately from the image. A plurality of regions of the correction image and the plurality of regions of the image may correspond to each other.

In addition, a motion rate may be acquired, which represents a rate of an average value of normal pixel values that are included in a region corresponding to the selected region, among the plurality of regions of the correction image, and an average value of a correction pixel value that is included in the region. In addition, flag information may be acquired, which represents that the selected region is one of the motion region and the normal region, based on the motion rate.

In an embodiment, when a magnitude value of a difference between the motion rate and a first reference value exceeds a second reference value, flag information may be acquired, which includes a first value that indicates that the selected region is the motion region. Also, when the magnitude value of the difference between the motion rate and the first reference value is equal to or smaller than the second reference value, flag information may be acquired, which includes a second value that indicates that the selected region is the normal region. For example, the first reference value may be 1, and the second reference value may be 0.3. However, this is merely an embodiment, and the first and second reference values may be modified and embodied as various values.

In addition, a restoration image including a restoration pixel value that is corrected from the short exposure pixel value that is included in the selected region may be output based on the flag information (S1230).

In an embodiment, when the flag information represents that the selected region is the motion region, the restoration pixel value may be acquired by using the short exposure pixel value according to a first manner.

In an embodiment, normal pixel values, among the normal pixel values, of the same color as the short exposure pixel value that is included in the selected region may be selected. A value according to a weight sum of distances between peripheral normal pixel values, among the selected normal pixel values, located closest in a plurality of directions to the short exposure pixel value, and the short exposure pixel value, and the peripheral normal pixel values may be acquired as the restoration pixel value.

Meanwhile, when a first peripheral normal pixel value, among the selected normal pixel values, located closest in any one direction, among the plurality of directions, to the short exposure pixel value does not exist, a second peripheral normal pixel value that is located closest in an opposite direction to the one direction may be acquired as the first peripheral normal pixel value.

In an embodiment, when the flag information represents that the selected region is the normal region, the restoration pixel value may be acquired by using the short exposure pixel value according to a second manner. A value that is obtained by multiplying the short exposure pixel value that is included in the selected region by the exposure ratio may be acquired as the restoration pixel value.

In an embodiment, a central region of a kernel may correspond to a null region, among the plurality of regions, in which the flag information does not exist, and flag information that indicates that the null region is one of the motion region and the normal region may be acquired according to the number of flag information that is included in regions, among the plurality of regions, corresponding to peripheral regions of the central region of the kernel.

The central region of the kernel may correspond to a motion flag region, among the plurality of regions, including the flag information that indicates a region is the motion region. The flag information that is included in the motion flag region may be maintained or be changed to the flag information that indicates that the region, among the plurality of regions, is the normal region, according to the number of flag information that represents the regions, among the plurality of regions, corresponding to the peripheral regions of the kernel and the motion region that is included in the motion flag region.

Figure 13:
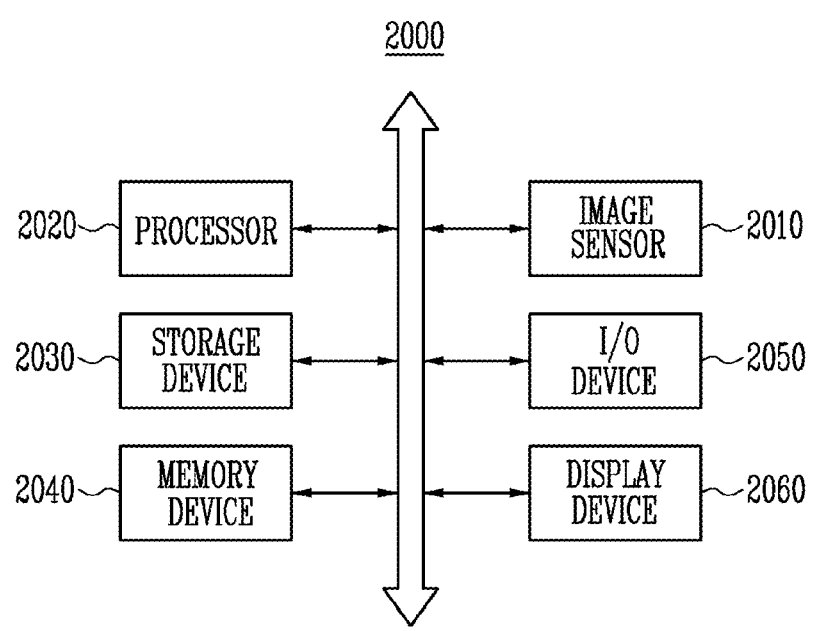
FIG. 13 is a diagram illustrating an implementation example of an electronic apparatus in accordance with an embodiment of the present disclosure.

FIG. 13 is a diagram illustrating an implementation example of an electronic apparatus in accordance with an embodiment of the present disclosure.

Referring to FIG. 13, the electronic apparatus 10 may be implemented as a computing system 2000. The computing system 2000 may include an image sensor 2010, a processor 2020, a storage device 2030, a memory device 2040, an input/output (I/O) device 2050, and a display device 2060. Although not shown in FIG. 13, the computing system 2000 may further include a port capable of communicating with the storage device 2030, the memory device 2040, the I/O device 2050, the display device 2060, and the like, or communicating with an external device.

The image sensor 2010 may acquire an image including a plurality of pixels to which an exposure value is individually applied. The image sensor 2010 may be connected to the processor 2020 through an address bus, a control bus, and a data bus, or a communication line different therefrom, to perform communication.

The image sensor 2010 may be implemented with a various types of packages. For example, at least some components of the image sensor 2010 may be implemented by using packages such as Package On Package (PoP), Ball Grid Arrays (BGAs), Chip Scale Packages (CSPs), Plastic Leaded Chip Carrier (PLCC), Plastic Dual In-line Package (PDIP), die in Waffle pack, die in wafer form, Chip On Board (COB), CERamic Dual In-line Package (CERDIP), plastic Metric Quad Flat Pack (MQFP), Thin Quad Flat Pack (TQFP), Small Outline Integrated Circuit (SOIC), Shrink Small Outline Package (SSOP), Thin Small Outline Package (TSOP), System In Package (SIP), Multi-Chip Package (MCP), Wafer-level Fabricated Package (WFP), or Wafer-level processed Stack Package (WSP). In some embodiments, the image sensor 2010 may be integrated together with the processor 2020 in one chip, or the image sensor 2010 and the processor 2020 may be integrated in different chips.

The processor 2020 may include at least one of a Central Processing Unit (CPU), an Application Processing Unit (APU), a Graphic Processing Unit (GPU), and the like.

The processor 2020 may be connected to the storage device 2030, the memory device 2040, and the I/O device 2050 through the address bus, the control bus, and the data bus, to perform communication. In accordance with an embodiment of the present disclosure, the processor 2020 may also be connected to an expansion bus such as a Peripheral Component Interconnect (PCI) bus.

The storage device 2030 may store data with an image, a motion map, and the like. The data stored in the storage device 2030 may be preserved not only when the computing system 2000 is driven but also when the computing system 2000 is not driven. For example, the storage device 2030 may be configured with at least one all types of nonvolatile memory devices such as a flash memory device, a Solid State Drive (SSD), a Hard Disk Drive (HDD), and an optical disk.

The memory device 2040 may store data with an image, a motion map, and the like. The memory device 2040 may temporarily store data to be processed by the processor 2020 or temporarily store data processed by the processor 2020. The data stored in the memory device 2040 may be preserved only when the computing system 2000 is driven. Alternatively, the data stored in the memory device 2040 may be preserved not only when the computing system 2000 is driven but also when the computing system 2000 is not driven. For example, the memory device 2040 may include volatile memory devices such as a Dynamic Random Access Memory (DRAM) and a Static Random Access Memory (SRAM), and nonvolatile memory devices such as an Erasable Programmable Read Only Memory (EPROM), an Electrically Erasable Programmable Read Only Memory (EEPROM), and a flash memory device.

The I/O device 2050 may include an input device and an output device. The input device is a device capable of inputting a command of a user through interaction, and may be implemented as, for example, a keyboard, a keypad, a mouse, a microphone, or the like. The output device is a device capable of outputting data, and may be implemented as a printer, a speaker, or the like.

The display device 2060 is a device for visually outputting an image. To this end, the display device 2060 may be implemented with various types of displays, such as a Liquid crystal Display (LCD) for controlling the molecular arrangement of liquid crystals by using a separate backlight unit (e.g., a light emitting diode (LED), etc.) as a light source, thereby adjusting a degree to which light emitted from the backlight unit is transmitted through the liquid crystals (brightness of light or intensity of light), and a display using, as a light source, a self-luminous element (e.g., a mini LED having a size of 100 to 200 μm, a micro LED having a size of 100 μm or less, an Organic LED (OLED), a Quantum dot LED (QLED), and the like). The display device 2060 may emit, to the outside, lights of red, green, and blue colors, which correspond to the output image.

In accordance with the present disclosure, there can be provided an electronic apparatus capable of detecting a motion region that is included in one image and an operating method of the electronic apparatus.

In accordance with the present disclosure, a motion region that is included in a current image can be detected without any previous image. Accordingly, the memory space and power consumption for storing previous images can be reduced. Further, noise can be reduced, thereby detecting a more accurate motion region.

While the present disclosure has been shown and described with reference to certain exemplary embodiments thereof, it will be understood by those skilled in the art that various changes in form and details may be made therein without departing from the spirit and scope of the present disclosure as defined by the appended claims and their equivalents. Therefore, the scope of the present disclosure should not be limited to the above-described exemplary embodiments but should be determined by not only the appended claims but also the equivalents thereof.

In the above-described embodiments, all steps may be selectively performed or part of the steps and may be omitted. In each embodiment, the steps are not necessarily performed in accordance with the described order and may be rearranged. The embodiments disclosed in this specification and drawings are only examples to facilitate an understanding of the present disclosure, and the present disclosure is not limited thereto. That is, it should be apparent to those skilled in the art that various modifications can be made on the basis of the technological scope of the present disclosure.

Meanwhile, the exemplary embodiments of the present disclosure have been described in the drawings and specification. Although specific terminologies are used here, those are only to explain the embodiments of the present disclosure. Therefore, the present disclosure is not restricted to the above-described embodiments and many variations are possible within the spirit and scope of the present disclosure. It should be apparent to those skilled in the art that various modifications can be made on the basis of the technological scope of the present disclosure in addition to the embodiments disclosed herein.

What is claimed is:

1. An electronic apparatus comprising:
   an image sensor configured to acquire an image including normal pixel values that are sensed during a first exposure time and short exposure pixel values that are sensed during a second exposure time that is shorter than the first exposure time; and
   a processor configured to:
   obtain a correction pixel value by multiplying a short exposure pixel value included in a selected region among a plurality of regions of the image by an exposure ratio of the first exposure time to the second exposure time;
   acquire flag information indicating that the selected region is one of a motion region and a normal region based on the correction pixel value and normal pixel values included in the selected region; and
   output a restoration image including a restoration pixel value that is corrected from the short exposure pixel value that is included in the selected region, based on the flag information.

2. The electronic apparatus of claim 1,
   wherein the processor includes an exposure corrector configured to acquire a correction image including the normal pixel values, and correction pixel values that are obtained by multiplying the short exposure pixel values by the exposure ratio.

3. The electronic apparatus of claim 2, wherein the processor includes:
   a motion rate calculator configured to acquire a motion rate that represents a rate of an average value of the normal pixel values included in the selected region to the correction pixel value; and
   a motion region detector configured to acquire the flag information based on the motion rate.

4. The electronic apparatus of claim 3, wherein the motion region detector is configured to:
   acquire the flag information with a first value that indicates that the selected region is the motion region when a magnitude value of a difference between the motion rate and a first reference value exceeds a second reference value; and
   acquire the flag information with a second value that indicates that the selected region is the normal region when the magnitude value is equal to or smaller than the second reference value.

5. The electronic apparatus of claim 1, wherein the processor includes a pixel corrector configured to:
   select normal pixel values, among the normal pixel values, of the same color as the short exposure pixel value that is included in the selected region, when the flag information represents that the selected region is the motion region, and acquire the restoration pixel value based on a weight sum of a distance between each of peripheral normal pixel values that are located closest in a plurality of directions to the short exposure pixel value among the selected normal pixel values and the short exposure pixel value, and the peripheral normal pixel values.

6. The electronic apparatus of claim 5,
wherein the plurality of directions include an upper direction, a lower direction, a left direction, and a right direction, and
wherein, when a first pixel value that is located closest in any one direction, among the plurality of directions, to the short exposure pixel value, among the selected normal pixel values, does not exist, the pixel corrector is configured to acquire, as the first pixel value, a second pixel value that is located closest in an opposite direction to the one direction to the short exposure pixel value.

7. The electronic apparatus of claim 5,
wherein, when the flag information indicates that the selected region is the normal region, the pixel corrector is configured to acquire, as the restoration pixel value, the correction pixel value.

8. The electronic apparatus of claim 1, wherein the processor includes a motion region detector configured to:
allow a central region, among the plurality of regions included in a first kernel, to overlap with a null region in which the flag information does not exist, and
acquire flag information that indicates that the null region is one of the motion region and the normal region, according to a number of first values of flag information that is included in peripheral regions of the null region, which correspond to peripheral regions of the central region, among the plurality of regions included in the first kernel.

9. The electronic apparatus of claim 8, wherein the processor includes a noise filter configured to:
allow a central region, among the plurality of regions included in a second kernel, to overlap with a motion flag region with the flag information that indicates that the selected region is the motion region, and
maintain the flag information that is included in the motion flag region or change the flag information that is included in the motion flag region to flag information that indicates that the selected region is the normal region, according to a number of first values of flag information that is included in peripheral regions of the motion flag region, which correspond to peripheral regions of the central region, among the plurality of regions, included in the second kernel.

10. The electronic apparatus of claim 8,
wherein the peripheral regions that are included in the first kernel or the second kernel include regions that are located in the upper direction, the lower direction, the left direction, and the right direction with respect to the central region of the first kernel or the second kernel.

11. A method of operating an electronic apparatus, the method comprising:
acquiring an image including normal pixel values that are sensed during a first exposure time and short exposure pixel values that are sensed during a second exposure time that is shorter than the first exposure time;
acquiring a correction pixel value by multiplying a short exposure pixel value included in a selected region among a plurality of regions of the image by an exposure ratio of the first exposure time to the second exposure time;
acquiring flag information indicating that the selected region is one of a motion region and a normal region based on the correction pixel value and normal pixel values included in the selected region; and
outputting a restoration image including a restoration pixel value that is corrected from the short exposure pixel value that is included in the selected region, based on the flag information.

12. The method of claim 11, wherein the acquiring of the flag information includes:
acquiring a correction image including the normal pixel values, and correction pixel values that are obtained by multiplying the short exposure pixel values by the exposure ratio;
acquiring a motion rate that indicates a rate of an average value of the normal pixel values included in the selected region and the correction pixel value; and
acquiring the flag information based on the motion rate.

13. The method of claim 12, wherein the acquiring of the flag information includes:
acquiring the flag information with a first value that indicates that the selected region is the motion region, when a magnitude value of a difference between the motion rate and a first reference value exceeds a second reference value; and
acquiring the flag information with a second value that indicates that the selected region is the normal region, when the magnitude value is equal to or smaller than the second reference value.

14. The method of claim 11, wherein the outputting of the restoration image includes:
acquiring the restoration pixel value by using the short exposure pixel value according to a first manner when the flag information indicates that the selected region is the motion region; and
acquiring the restoration pixel value by using the short exposure pixel value according to a second manner when the flag information indicates that the selected region is the normal region.

15. The method of claim 14, wherein the acquiring of the restoration pixel value by using the short exposure pixel value according to the first manner includes:
selecting normal pixel values, among the normal pixel values, of the same color as the short exposure pixel value that is included in the selected region; and
acquiring, as the restoration pixel value, based on a weight sum of a distance between each of peripheral normal pixel values among the selected normal pixel values located closest in a plurality of directions to the short exposure pixel value and the short exposure pixel value, and the peripheral normal pixel values.

16. The method of claim 14, further comprising, when a first pixel value that is located closest in any one direction, among the plurality of directions, to the short exposure pixel value, among the selected normal pixel values, does not exist, acquiring, as the first pixel value, a second pixel value that is located closest in an opposite direction to the one direction to the short exposure pixel value.

17. The method of claim 14,
wherein, in the acquiring of the restoration pixel value by using the short exposure pixel value according to the second manner, the correction pixel value that is obtained by multiplying the short exposure pixel value included in the selected region by the exposure ratio as the restoration pixel value.

18. The method of claim 11, further comprising:
allowing a central region, among the plurality of regions, included in a kernel to correspond to a null region in which the flag information does not exist, and acquiring flag information that indicates that the null region is one of the motion region and the normal region, according to a value of flag information that is included in regions, among the plurality of regions, corresponding to peripheral regions of the central region of the kernel; and
allowing the central region to correspond to a motion flag region with the flag information that indicates that the selected region is the motion region among the plurality of regions, and maintaining the flag information that is included in the motion flag region or changing the flag information that is included in the motion flag region to flag information that indicates that the selected region is the normal region, according to a value of the flag information that indicates that the selected region is the motion region, which is included in regions, among the plurality of regions, corresponding to the peripheral regions of the motion flag region.

19. An electronic apparatus comprising:
a communication interface configured to receive, from an external device, an image including normal pixel values and short exposure pixel values, which are sensed during different exposure times; and
a processor configured to:
obtain a first correction pixel value by multiplying a short exposure pixel value included in a selected region among a plurality of regions of the image by an exposure ratio of the different exposure times;
determine, whether the selected region among the plurality of regions of the image is a motion region or a normal region, based on the first correction pixel value and normal pixel values included in the selected region;
correct the short exposure pixel value to the first correction pixel value, when the selected region is the normal region; and
correct the short exposure pixel value to second correction pixel value, which is obtained based on a weighted sum of peripheral pixel values of the short exposure pixel value, when the selected region.

20. The electronic apparatus of claim 19,
wherein the number of the short exposure pixel values is smaller than that of the normal pixel values, and
wherein a color of the short exposure pixel values is a green color.

* * * * *